(12) United States Patent
Jones et al.

(10) Patent No.: US 10,839,360 B2
(45) Date of Patent: *Nov. 17, 2020

(54) CONTROL SYSTEM FOR WIRELESS COMMUNICATION PARKING METER

(71) Applicant: DUNCAN PARKING TECHNOLOGIES, INC., Milwaukee, WI (US)

(72) Inventors: Gavin Jones, Pymble (AU); Balu Subramanya, Darnestown, MD (US); Mike Nickolaus, Milwaukee, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/292,284

(22) Filed: Mar. 4, 2019

(65) Prior Publication Data
US 2020/0005265 A1    Jan. 2, 2020

Related U.S. Application Data

(63) Continuation of application No. 16/039,558, filed on Jul. 19, 2018, now abandoned, which is a
(Continued)

(51) Int. Cl.
*G06K 5/00* (2006.01)
*G06Q 20/14* (2012.01)
(Continued)

(52) U.S. Cl.
CPC ....... *G06Q 20/145* (2013.01); *G06Q 30/0284* (2013.01); *G07B 15/00* (2013.01);
(Continued)

(58) Field of Classification Search
CPC ... G06Q 20/146; G06Q 30/0284; H04W 4/70; G07B 15/00; G07B 15/02; G07C 1/20;
(Continued)

(56) References Cited

U.S. PATENT DOCUMENTS 2,483,805 A    10/1949   Broussard et al.
2,495,784 A    1/1950    Starts
(Continued)

FOREIGN PATENT DOCUMENTS

JP    08-305998       11/1996
JP    2011-060206     3/2011
(Continued)

OTHER PUBLICATIONS

International Search Report and Written Opinion for International Application No. PCT/US2012/037229, dated Jan. 28, 2013, 14 pages.
(Continued)

*Primary Examiner* — Karl D Frech
(74) *Attorney, Agent, or Firm* — Hunton Andrews Kurth LLP

(57) ABSTRACT

An electronic parking meter mechanism is provided. The electronic meter mechanism includes an inner housing, an electronic display screen and a wireless communication subsystem configured to wirelessly communicate with a parking management system. The electronic meter mechanism includes a first processor configured to control the electronic display screen, and a second processor configured to control communication of data by the wireless communication subsystem.

1 Claim, 27 Drawing Sheets

Related U.S. Application Data continuation of application No. 15/346,860, filed on Nov. 9, 2016, now Pat. No. 10,032,150, which is a continuation of application No. 13/468,876, filed on May 10, 2012, now Pat. No. 9,524,498.

(60) Provisional application No. 61/484,568, filed on May 10, 2011.

(51) Int. Cl.
| | |
|---|---|
| G07C 5/02 | (2006.01) |
| G07F 17/24 | (2006.01) |
| G06Q 30/02 | (2012.01) |
| G07C 1/30 | (2006.01) |
| G07B 15/02 | (2011.01) |
| H04W 4/70 | (2018.01) |
| G07B 15/00 | (2011.01) |
| G08G 1/14 | (2006.01) |

(52) U.S. Cl.
CPC .............. *G07B 15/02* (2013.01); *G07C 1/30* (2013.01); *G07C 5/02* (2013.01); *G07F 17/24* (2013.01); *G07F 17/248* (2013.01); *G08G 1/141* (2013.01); *H04W 4/70* (2018.02); *Y04S 50/14* (2013.01)

(58) Field of Classification Search
CPC ......... G07C 5/02; G07F 17/24; G07F 17/248; G08G 1/141; Y04S 50/14
USPC .............. 235/380, 382, 375, 384; 705/14.58
See application file for complete search history.

(56) References Cited

U.S. PATENT DOCUMENTS

| | | | |
|---|---|---|---|
| 2,550,433 | A | 4/1951 | Tichenor |
| 2,594,388 | A | 4/1952 | Broussard |
| 2,596,122 | A | 5/1952 | Broussard |
| 2,596,123 | A | 5/1952 | Broussard |
| 2,596,124 | A | 5/1952 | Broussard |
| 2,613,792 | A | 10/1952 | Broussard et al. |
| 2,613,871 | A | 10/1952 | Broussard et al. |
| 2,618,371 | A | 11/1952 | Broussard |
| 2,633,960 | A | 4/1953 | Broussard |
| 2,822,682 | A | 2/1958 | Sollenberberg |
| 2,995,230 | A | 8/1961 | Moody et al. |
| 3,199,321 | A | 8/1965 | Sollenberger |
| 3,204,438 | A | 9/1965 | Sollenberger |
| 3,262,540 | A | 7/1966 | Sollenberger et al. |
| 3,272,299 | A | 9/1966 | Sollenberger |
| 3,438,031 | A | 4/1969 | Fathauer |
| 3,519,113 | A | 7/1970 | Arzig et al. |
| 3,565,283 | A | 2/1971 | Sciacero et al. |
| 4,603,331 | A | 7/1986 | Wehner |
| 4,880,406 | A | 11/1989 | Van Horn et al. |
| 5,060,777 | A | 10/1991 | Van Horn et al. |
| 5,109,972 | A | 5/1992 | Van Horn et al. |
| 5,119,916 | A | 6/1992 | Carmen et al. |
| 5,155,614 | A | 10/1992 | Carmen et al. |
| 5,184,707 | A | 2/1993 | Van Horn et al. |
| 5,244,070 | A | 9/1993 | Carmen et al. |
| 5,273,151 | A | 12/1993 | Carmen et al. |
| 5,382,780 | A | 1/1995 | Carmen |
| 5,526,662 | A | 6/1996 | Diekhoff et al. |
| 5,710,743 | A | 1/1998 | Dee et al. |
| 5,805,083 | A | 9/1998 | Sutton et al. |
| 5,806,651 | A | 9/1998 | Carmen et al. |
| 5,841,369 | A | 11/1998 | Sutton et al. |
| 6,037,880 | A | 3/2000 | Manion |
| 6,111,522 | A | 8/2000 | Hiltz et al. |
| D431,788 | S | 10/2000 | Tuxen et al. |
| RE37,193 | E | 5/2001 | Ward, II |
| 6,230,868 | B1 | 5/2001 | Tuxen et al. |
| 6,243,029 | B1 | 6/2001 | Tomer |
| 6,309,098 | B1 | 10/2001 | Wong |
| 6,312,152 | B2 | 11/2001 | Dee et al. |
| 6,354,425 | B1 | 3/2002 | Tuxen et al. |
| D461,728 | S | 8/2002 | Tuxen et al. |
| 6,505,774 | B1 | 1/2003 | Fulcher et al. |
| 6,874,340 | B1 | 4/2005 | Berman |
| 6,889,899 | B2 | 5/2005 | Silberberg |
| 7,019,670 | B2 | 3/2006 | Bahar |
| 7,230,545 | B2 | 6/2007 | Nath |
| 7,237,176 | B2 | 6/2007 | Briggs et al. |
| D575,168 | S | 8/2008 | King et al. |
| D587,141 | S | 2/2009 | King et al. |
| 7,617,120 | B2 | 11/2009 | Derasmo et al. |
| 7,806,248 | B2 | 10/2010 | Hunter et al. |
| 7,825,826 | B2 | 11/2010 | Welch |
| 7,854,310 | B2 | 12/2010 | King et al. |
| 7,874,482 | B2 | 1/2011 | Mitschele |
| RE43,245 | E | 3/2012 | Ouimet et al. |
| D659,557 | S | 5/2012 | Jones et al. |
| 8,193,540 | B2 | 6/2012 | Huang et al. |
| D684,870 | S | 6/2013 | Jones |
| 8,590,687 | B2 | 11/2013 | King et al. |
| 8,631,921 | B2 | 1/2014 | Jones |
| 8,662,279 | B2 | 3/2014 | Jones |
| 8,684,158 | B2 | 4/2014 | Jones |
| 8,749,403 | B2 | 6/2014 | King et al. |
| 9,196,097 | B2 | 11/2015 | Jones |
| 9,524,498 | B2 * | 12/2016 | Jones ..................... G07B 15/02 |
| 9,697,506 | B2 | 7/2017 | Jones et al. |
| 10,121,172 | B2 | 11/2018 | Hunson et al. |
| 2002/0074344 | A1 | 6/2002 | Long et al. |
| 2003/0112151 | A1 | 6/2003 | Chauvin et al. |
| 2003/0128136 | A1 | 7/2003 | Spier et al. |
| 2003/0132840 | A1 | 7/2003 | Bahar |
| 2003/0144905 | A1 | 7/2003 | Smith |
| 2004/0160905 | A1 | 8/2004 | Bernier et al. |
| 2005/0168352 | A1 | 8/2005 | Tomer |
| 2006/0173733 | A1 | 8/2006 | Fancher |
| 2006/0255119 | A1 | 11/2006 | Marchasin et al. |
| 2007/0210935 | A1 | 9/2007 | Yost et al. |
| 2008/0158010 | A1 | 7/2008 | Nath et al. |
| 2008/0245638 | A1 | 10/2008 | King et al. |
| 2009/0026842 | A1 | 1/2009 | Hunter et al. |
| 2009/0095593 | A1 | 4/2009 | King et al. |
| 2009/0099761 | A1 | 4/2009 | Davis et al. |
| 2009/0159674 | A1 | 6/2009 | King et al. |
| 2009/0183966 | A1 | 7/2009 | King et al. |
| 2009/0192950 | A1 | 7/2009 | King et al. |
| 2009/0267732 | A1 | 10/2009 | Chauvin et al. |
| 2009/0287578 | A1 | 11/2009 | Paluszek et al. |
| 2010/0153193 | A1 | 6/2010 | Ashby et al. |
| 2011/0022427 | A1 | 1/2011 | Dayan |
| 2011/0057815 | A1 | 3/2011 | King et al. |
| 2011/0060653 | A1 | 3/2011 | King et al. |

FOREIGN PATENT DOCUMENTS

| | | |
|---|---|---|
| KR | 10-2000-0016671 | 3/2000 |
| KR | 10-2001-0028481 | 4/2001 |
| KR | 10-2008-0041730 | 5/2008 |
| WO | 00-59201 | 10/2000 |
| WO | 02-063570 | 8/2002 |
| WO | 2012154902 | 11/2012 |

OTHER PUBLICATIONS

Duncan Solutions, Parking and Enforcement From Start to Finish, Intermec CN50, available at http://www.duncansolutions.com/IntermecCN50.html, believed to be commercially available before May 10, 2010, 2 pages.

Duncan Solutions, Parking and Enforcement From Start to Finish, Motorola MC75, available at http://www.duncansolutions.com/MotorolaMC75.html, believed to be commercially available before May 10, 2010, 1 page.

Duncan Solutions, VMIVS Pay-by-Space Multi-Space Meter Brochure, available at http://www.duncansolutions.com/pdfsIVM.pdf,

(56) References Cited

OTHER PUBLICATIONS believed to be commercially available before May 10, 2010, 2 pages.
Duncan Solutions, AutoCITE X3 Handheld http://www.duncansolutions.com/pdfs/X3.pdf, believed to be commercially available before May 10, 2010, 2 pages.
AutoiSSUE Automated Citation Issuance System Brochure, believed to be commercially available before May 10, 2010, 2 pages.
Duncan Solutions, AutoTRAX Meter Management System Brochure, believed to be commercially available before May 10, 2010, 2 pages.
Duncan Solutions, Eagle CK Single-Space Meter Mechanism Brochure, believed to be commercially available before May 10, 2010, 2 pages.
Duncan Solutions, Eagle 2100 Single-Space Meter Mechanism Brochure, believed to be commercially available before May 10, 2010, 2 pages.
International Search Report and Written Opinion for International Application No. PCT/US2012/037205, dated Oct. 4, 2012, 10 pages.

\* cited by examiner

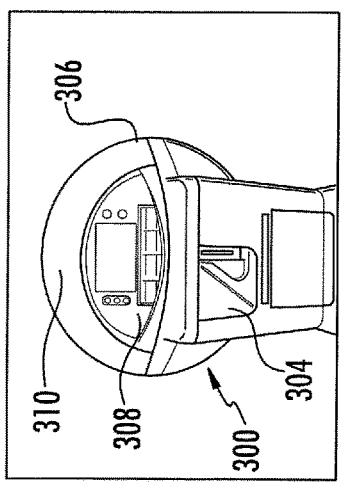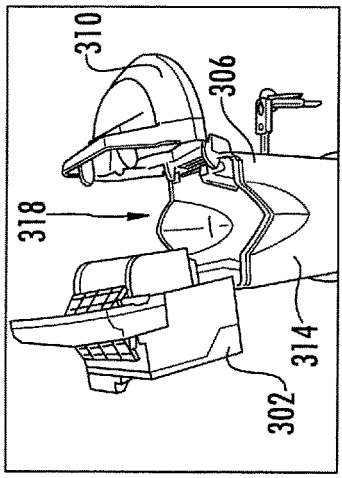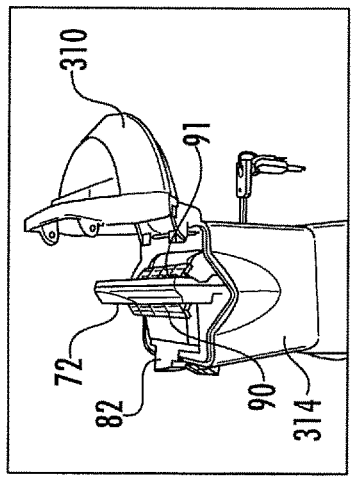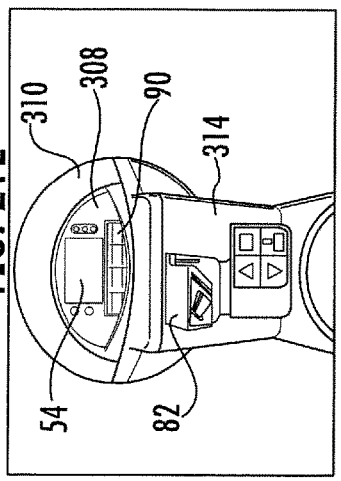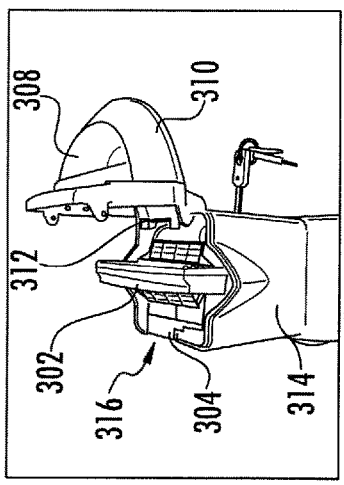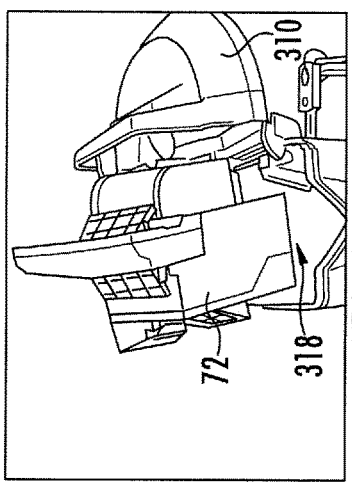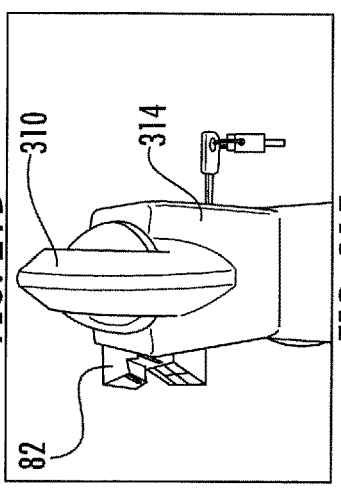

CONTROL SYSTEM FOR WIRELESS COMMUNICATION PARKING METER

CROSS-REFERENCE TO RELATED PATENT APPLICATION

This application is a continuation of U.S. patent application Ser. No. 15/346,860, filed Nov. 9, 2016, which is a continuation of U.S. patent application Ser. No. 13/468,876, filed May 10, 2012, now issued as U.S. Pat. No. 9,524,498 on Dec. 20, 2016, which claims the benefit of U.S. Provisional Patent Application No. 61/484,568 titled "PARKING METER SYSTEMS AND METHODS," filed May 10, 2011, all of which are incorporated herein by reference in their entireties.

BACKGROUND OF THE INVENTION

The present invention relates generally to the field of parking meter systems, devices and methods. The present invention relates specifically to a parking meter system equipped for wireless communication between the various components of the parking system.

Single space parking meters are typically associated with a single parking space. To utilize an individually metered parking space, a motorist typically inserts money into the parking meter, and the parking meter displays an amount of time related to the amount of money inserted. A multi-space meter typically provides a single payment location for more than one parking spot, and the multi-space meter receives payment and tracks meter time for the multiple parking spots. For either type of meter, the motorist may park at the metered spot for the amount of parking time purchased. When the time on the meter expires, the motorist may move their car or add more time to the meter. If the meter expires and the motorist remains parked at the meter, a parking enforcement officer may issue a parking ticket. A city or other entity may operate a city wide system of single space parking meters and/or multi-space meters.

SUMMARY OF THE INVENTION

Generally, one embodiment of the invention relates to an electronic parking meter mechanism. The electronic meter mechanism includes an inner housing, an electronic display screen and a wireless communication subsystem configured to wirelessly communicate with a parking management system. The electronic meter mechanism includes a first processor configured to control the electronic display screen, and a second processor configured to control communication of data by the wireless communication subsystem.

Another embodiment of the invention relates to an electronic parking meter mechanism including an inner housing including a front side and a rear side. The mechanism includes an electronic display screen supported by the inner housing and a first processor configured to control the electronic display screen. The mechanism includes a wireless communication subsystem supported by the inner housing configured to wirelessly communicate with a parking management system and a second processor configured to control communication of data by the wireless communication subsystem.

Another embodiment of the invention relates to an electronic parking meter control system configured to communicate with a single space meter processor that controls the display and time keeping functions of a single space parking meter. The control system includes a processor configured to be communicably coupled to the single space meter processor and wireless communication hardware communicably coupled to the processor. The processor is configured to receive data from the single space meter processor and is configured to control the wireless communications hardware to transmit the received data to the parking management system.

Another embodiment of the invention relates to an electronic parking meter device including an inner housing including a front side and a rear side and wireless communications hardware supported by the inner housing configured to wirelessly communicate with a parking management system. The device includes a credit card mag-strip reader supported by the inner housing and a currency reader including a slot for receiving currency located on the front side of the inner housing, The device includes an electronic display screen supported by the inner housing including both front and rear displays and a keypad located below the slot of the currency reader. The device includes a vehicle sensor configured to detect a vehicle located within a parking space associated with the electronic meter mechanism and to generate a signal indicative of the presence of the vehicle within the parking space. The device includes a first processor configured to perform parking meter time keeping functions. The device includes a second processor configured to receive signals from the credit card mag-strip reader and the vehicle sensor and to control communications via the wireless communications hardware.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIGS. 21A, 21B, 21C, 21D, 21E, 21F, and 21G show a process for upgrading a single-space parking meter with a new electronic meter mechanism according to an exemplary embodiment.

DETAILED DESCRIPTION

Figure 1:
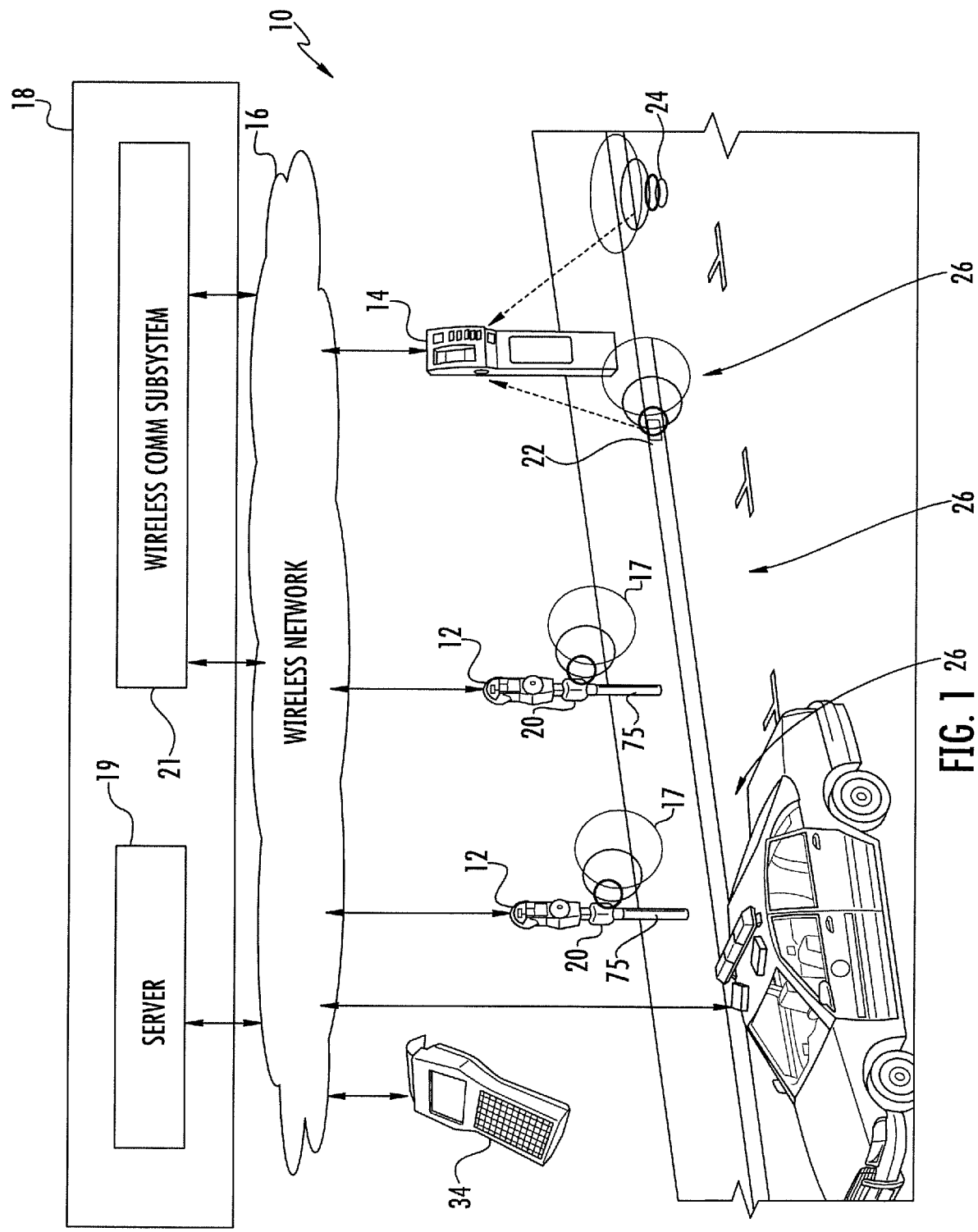
FIG. 1 shows a parking system according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to FIGS. 1, 5, 6 and 7, various exemplary embodiments of parking system 10 are shown. In the exemplary embodiment of FIG. 1, parking system 10 includes one or more single-space parking meters 12, one or more multi-space parking meters 14, a communication network, shown as wireless network 16, and a parking system control system, shown as parking management system 18. Both single-space meters 12 and multi-space meter 14 may be configured to communicate with parking management system 18 by directly accessing wireless network 16. In various embodiments, wireless network 16 may be a mobile telephone system, and meters 12 and 14 may access wireless network 16 utilizing standard mobile telephone systems (e.g., GSM, GPRS, EDGE, 2.5G, 3G, 4G, etc.).

As discussed in more detail below, meters 12 and 14 are configured to communicate parking meter data to parking management system 18 via wireless network 16, and the communicated parking meter data is utilized by parking management system 18 to provide the parking system functionalities discussed herein. For example, parking management system 18 is a computerized, server system that provides for processing, storage and management of data within parking system 10. In one embodiment shown in FIG. 1, parking management system 18 includes at least one server 19 and wireless communications subsystem 21. Server 19 is configured to store and process parking data associated with a particular parking spot (e.g., current parking space occupancy information, current meter time, vehicle sensor data, information regarding mode of payment, vehicle arrival information, vehicle departure information, parking rates, Location information, etc.), including parking data received wirelessly from the meters, to generally provide the parking system functions discussed herein. Wireless communications hardware 21 of parking management system 18 is configured to allow server 19 to communicate wirelessly with the various components of parking system 10 discussed herein.

Further, server 19 is configured to store and generate data that may be communicated wirelessly to the various components of parking system 10, and in this embodiment, wireless communication hardware 21 is configured to transmit system data or information from server 19 to the appropriate component of the parking system. For example, wireless communications hardware 21 is configured to transmit and meters 12 and 14 are configured to receive information from parking management system 18 via wireless network 16. The system data transmitted from parking management system 18 and received by the parking meters may include parking meter configuration data, parking rate data, time and date data, testing and diagnostic data, parking meter software updates, etc. It should be understood that while the embodiments discussed herein relate primarily to a parking system that communicates with parking management system 18 via a wireless communication network 16, in other embodiments, a wired or a combination wired/wireless communication network may be used to provide communication to parking management system 18.

Parking system 10 also includes one or more vehicle sensors, shown as pole-mount vehicle sensors 20, curb surface-mount sensor 22 and street surface-mount sensor 24. Generally, sensors 20, 22 and 24 are each associated with a single parking space 26 and are configured to detect the presence of a vehicle located in the associated parking space, to detect entry of a vehicle into the associated parking space and/or to detect the exit of a vehicle from the associated parking space. In the embodiment of FIG. 1, a pole-mount sensor 20 is associated with and in communication with each single-space meter 12, and sensors 22 and 24 are associated with and in communication with multi-space meter 14. In other embodiments, a subterranean sensor 28 (see FIG. 4) may be located beneath the surface of the parking spot in place of street surface-mount sensor 24. In other embodiments, a curb surface-mount sensor 22, a street surface-mount sensor 24 or subterranean sensor 28, may be associated with a single-space meter 12 instead of pole-mount sensor 20. Generally, vehicle sensors 20, 22 and 24 are directional sensors (i.e., sensor that only senses in a particular region or direction) and include a targetable detection zone. Generally, the vehicle sensors are positioned such that the targetable detection zone is located within the parking space associated with the meter and is not located in adjacent parking spaces.

Vehicle sensors 20, 22, 24 and 28 are configured to detect one or more aspect (e.g., presence, entry, exit, etc.) of a vehicle within the parking spot associated with the sensor and to generate a signal indicative of the detected aspect of the vehicle. The generated signal is then communicated from the sensor to a controller associated with the parking meter for the parking spot. In various embodiments, communication from the sensors to the associated meter may be either through wired or wireless communication. As explained in more detail below, the parking meter may execute various functions in response to the detected aspect of the vehicle and may send data to and/or receive data from parking management system 18 in response to the detected aspect of the vehicle. In addition, data generated by the vehicle sensor associated with each meter (e.g., data related to the presence of a vehicle within the space associated with the meter) may be communicated to parking management system 18 via the wireless communications hardware of the meter.

Figure 5:
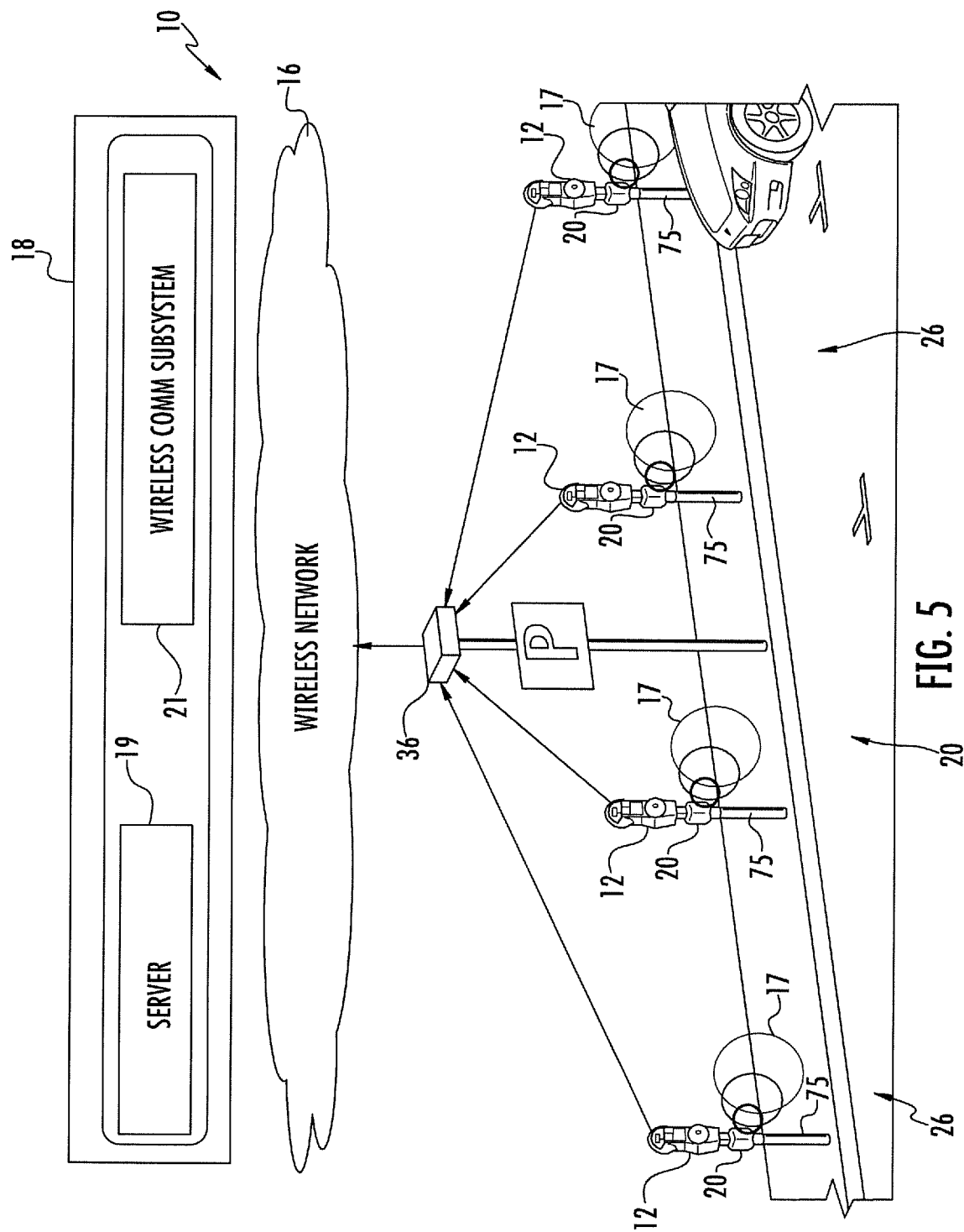
FIG. 5 shows a parking system according to an exemplary embodiment.
Figure 6:
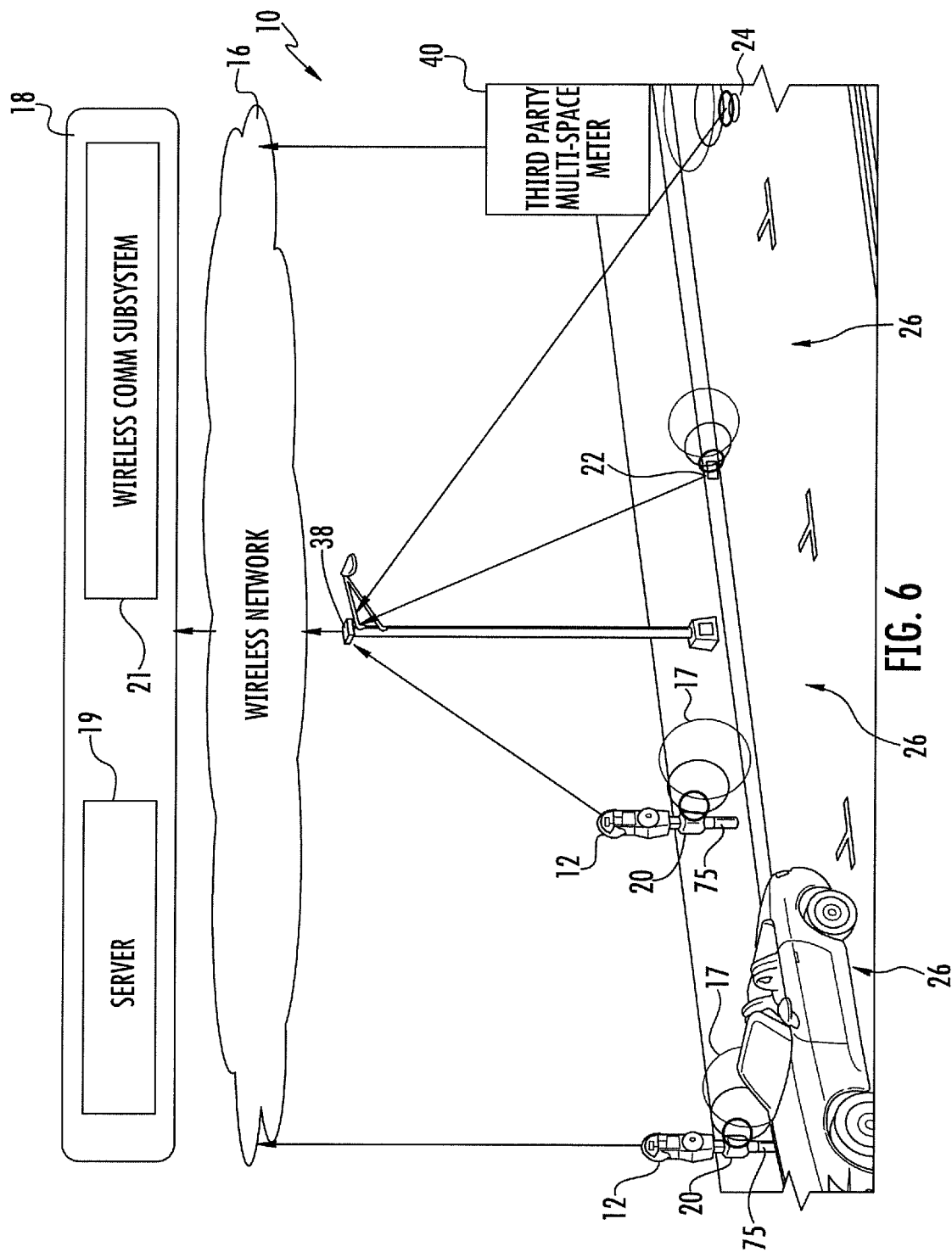
FIG. 6 shows a parking system according to an exemplary embodiment.

Referring to FIGS. 1, 5 and 6, parking system 10 include a plurality of single-space meters 12 (e.g., 2, 3, 4, . . . 50, . . . 100, more than 2, more than 10, more than 20, more than 50, more than 100, etc., single-space meters), and may include one or more multi-space parking meters 14. In the embodiment shown, each single-space parking meter 12 includes a vehicle sensor, shown as vehicle sensor 20, physically coupled to and supported by the parking meter pole 75. As shown pole 75 includes a lower end coupled to the ground adjacent to and set back from parking space 26 associated with the meter 12 such that there is a distance or space located between pole 75 and space 26. With vehicle sensor 20 coupled to pole 75, a space is present between vehicle sensor 20 and parking space 26, and vehicle sensor 20 is configured to detect an aspect of a vehicle located within parking space 26 across the space. As shown in FIG. 1, vehicle sensor 20 includes a targetable detection zone 17, and vehicle sensor 20 is positioned on pole 75 such that the detection zone 17 of vehicle sensor 20 is located within parking space 26. In another embodiment, vehicle sensor 20 may be physical coupled to and supported by the parking meter housing. In these embodiments, vehicle sensor 20 is located above both the street and sidewalk surface and is also set back from the curb.

Physically supporting the vehicle sensor in close proximity to the meter mechanism and electronics of the single-space meter 12 allows for robust electrical communication between the vehicle sensor and the electronics of the single-space meter. In the embodiment shown, vehicle sensor 20 is communicably coupled with the control circuitry of single-space meter 12 (e.g., controller 200 shown in FIG. 13) directly via a dedicated hardwired connection. The robust electrical connection permitted by the proximity between the single-space meter electronics and vehicle sensor 20 allows for shared use of certain components. For example, in the embodiment shown, both the electronics of the single-space meter and vehicle sensor 20 share a common power supply (e.g., solar cells and battery). In addition, this arrangement allows both single-space meter 12 and vehicle sensor 20 to utilize a single set of wireless communications hardware. Specifically, data generated by vehicle sensor 20 is communicated first to a control system associated with the mechanism of single-space meter 12, and then is communicated to parking management system 18 via a wireless communication link. In this embodiment, the hardwired connection between vehicle sensor 20 and single-space meter 12 is a combined data communication link and power connection delivering power to vehicle sensor 20 from a power source (e.g. batter, solar panel, etc.) physically located within the outer housing of the single space meter.

Referring to FIGS. 1 and 6, in various embodiments, parking system 10 may also include curb mount vehicle sensors 22 and/or street mount vehicle sensors 24 that communicate parking space usage information wirelessly to a multi-space meter 14 or to parking management system 18. In contrast to pole-mount sensors 20, curb mount vehicle sensors 22 and/or street mount vehicle sensors 24 include their own power supply and communications hardware. In the embodiment shown in FIG. 1, curb mount vehicle sensors 22 and/or street mount vehicle sensors 24 are stand-alone sensors configured for short relatively short range wireless communication to a multi-space meter 14, and multi-space meter 14 is configured for cellular communication with parking management system 18.

Figure 2:
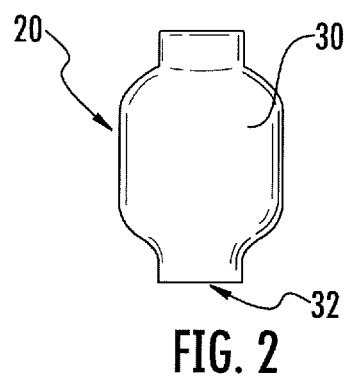
FIG. 2 shows a pole-mount vehicle sensor according to an exemplary embodiment.
Figure 3:
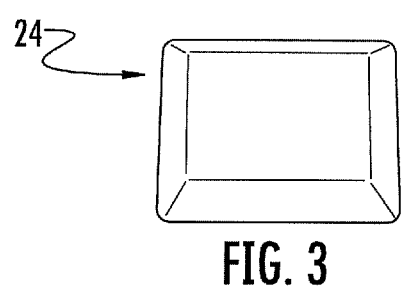
FIG. 3 shows a surface-mount vehicle sensor according to exemplary embodiments.
Figure 4:
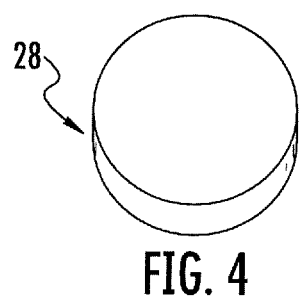
FIG. 4 shows a subterranean sensor according to an exemplary embodiment.

Referring to FIGS. 2-4, exemplary embodiments of sensors 20, 22, 24 and 28 are shown. FIG. 2 shows pole-mount vehicle sensor 20. As shown in FIG. 2, pole-mount vehicle sensor 20 includes a housing 30 having a central cavity 32. During mounting to a single-space meter 12, the parking meter pole is received within cavity 32 to couple pole-mount vehicle sensor 20 to single-space meter 12. The sensing element (e.g., an electromagnetic energy transmitter and receiver, transceiver, etc.) is located within housing 30. In the embodiment shown in FIG. 1, housing 30 of vehicle sensor 20 surrounds pole 75, and the upper end of housing 30 is coupled to the lower end of the outer meter housing (e.g., outer meter housing 70 shown in FIG. 8). In addition, the wired communication link communicably coupling the sensing element of vehicle sensor 20 to the processor of the single space meter is located within both sensor housing 30 and the outer meter housing. Specifically the portion of the wired communication link coupled to the sensing element is located within sensor housing 30 and the portion of the communication link coupled to the processor of the electronic meter mechanism is located with the outer meter housing. Sensor housing 30 acts to protect and supports the sensing element and the wired connection to the electronic meter mechanism. In the embodiment in which a hardwired connection couples vehicle sensor 20 to the electronic meter mechanism, vehicle sensor 20 does not include dedicated wireless communications hardware within sensor housing 30. In one embodiment, the vehicle sensors disclosed herein includes a local vehicle sensor processor the first processes the signal from the sensing element and then communicates the processed signal indicative of a vehicle in the parking space to a processor that controls the wireless communications hardware.

FIG. 3 shows surface-mount sensors 22 or 24 that may be coupled to either the curb surface or the surface of the parking space using a suitable attachment mechanism, such as epoxy. FIG. 4 shows subterranean sensor 28 that may be located below the surface of parking space 26. Similar to sensors 22 and 24 discussed above, subterranean sensor 28 communicates with meters 12 and 14 via a wireless connection and may be used in place of either sensor 22 or 24 in the parking system embodiments discussed herein.

In one embodiment, sensors 20, 22, 24 and 28 may be sensors configured to utilize electromagnetic energy to detect the presence of the vehicle in the parking space, and specifically, sensors 20, 22, 24 and 28 may be a radiofrequency (RF) sensor including a radiofrequency-based sensing element. In other embodiments, sensors 20, 22, 24 and 28 may be non-electromagnetic sensors In other embodiments, sensors 20, 22, 24 and 28 may be any sensors suitable for detecting an aspect of a vehicle in the associated parking space. For example, sensors 20, 22, 24 and 28 may be infrared reflectance sensors, ultrasonic sensors, capacitance sensors, proximity sensors, magnetic sensors, magnetic-flux sensors, non-intrusive sensors, radar-based sensors, a low power/broad spectrum radar sensor, time of flight sensors, ranging sensors, etc. Further, because sensor 24 (or sensor 28) is physically in contact with parking space 26 (e.g., in contact with the parking space surface in the case of a surface-mount sensor or beneath parking space 26 in the case of a subterranean sensor 28), sensor 24 (or sensor 28) may be a weight sensor or movement sensor that is reactive to a vehicle in parking space 26.

In addition to generating signals indicative of vehicle presence, vehicle entry to the parking spot and vehicle exit from a parking spot, vehicle sensors 20, 22, 24 and 28 may be configured to generate other signals related to the parking spot or vehicles located in the parking spot that may be used by parking system 10. For example, the vehicle sensors may be configured to generate a signal indicative of a vacant parking spot. In another embodiment, the vehicle sensors may be configured to generate a signal indicative of the type of vehicle located in the parking spot. For example, the vehicle sensor may be configured to generate a signal indicative of a motorcycle, a signal indicative of a car, a signal indicative of a truck, etc., being present in parking space 26. As another example, the vehicle sensor may be configured to generate a signal indicative of a privately owned vehicle located in parking space 26 and a different signal indicative of a publicly-owned or government vehicle located in parking space 26. In other embodiments, a vehicle sensor may include a digital camera configured to capture image data of a vehicle located in the parking spot.

Referring back to FIG. 1, parking system 10 may include one or more mobile citation units, shown as handheld unit 34. Handheld unit 34 communicates with parking management system 18 via wireless network 16. In the embodiment shown in FIG. 1, handheld unit 34 includes wireless communications hardware for communication with parking management system 18 via wireless network 16. Handheld unit 34 is carried by parking enforcement personnel and is used to issue citations for parking violations. Handheld unit 34 sends various types of enforcement data (e.g., data indicating issuance of a citation, data related to the type of citation issued, location of parking violation, vehicle identification information, etc.) to parking management system 18 via wireless network 16. Handheld unit 34 also receives various information from parking management system 18. In one embodiment, handheld unit 34 receives information to facilitate the issuances of citations. For example, handheld unit 34 may receive data indicative of the existence and location of expired meters. In one embodiment, handheld unit 34 may receive data regarding which meters within a certain distance from unit 34 are expired. It should be understood that while the figures show a handheld citation unit, other mobile citation units may be used within parking system 10. For example, a mobile citation unit may be mounted within a vehicle driven by enforcement personnel.

In one embodiment, data generated by the vehicle sensor associated with each meter (e.g., data related to the presence of a vehicle within the space associated with the meter) may be communicated to parking management system 18 via the wireless communications hardware of the meter, and the data related to current space occupancy may be communicated from parking management system 18 to handheld unit 34. In an exemplary embodiment, the data generated by the vehicle sensors associated with each parking meter is processed to determine whether a vehicle is currently parked in the meter's parking space when time on the meter expires. If so it is determined that a parking violation has occurred. The single space meter then communicates data indicating that a parking violation has occurred to parking management system 18. Parking management system 18 then stores and communicates the data indicating that a parking violation has occurred to the handheld unit 34. This data then may be used by the enforcement personnel to issue a parking ticket. In one embodiment, following issuance of a parking ticket, data indicating that a parking ticket has been issued is communicated wirelessly from handheld unit 34 to parking management system 18 for processing and storage. In one embodiment, the data indicating that a parking ticket has been issued includes information identifying the vehicle (e.g., VIN, license plate information, etc.) that received the citation.

As can be seen, parking system 10 provides a system utilizing wireless communication between the three major components or subsystems (e.g., the meters, the management system, and the citation units). By providing a system in which the components in the field (e.g., the meters and the citation units) communicate wirelessly to parking management system 18, data storage and processing for parking system 10 can be centralized within parking management system 18. Further, parking system 10 allows real-time data from meters system-wide to communicate information to parking management system 18, which in turn allows up to date information regarding parking violations to be communicated to citation units 34 system wide.

Referring to FIG. 5, parking system 10 is shown according to another exemplary embodiment. In this embodiment, parking system 10 includes a plurality of single-space meters 12 each having a pole-mounted vehicle sensor 20, a wireless network 16 and a parking management system 18. This embodiment of parking system 10 includes a gateway 36, and single-space meters 12 are configured for short-range communication with gateway 36. In this embodiment, gateway 36 provides the communication link between multiple meters 12 and parking management system 18 via wireless network 16. In one such embodiment, single-space meters 12 are configured for short-range RF communication with gateway 36, and gateway 36 is configured for communication (e.g., cellular, WIFI, etc.) with parking management system 18 via wireless network 16. Communication between meters 12 and gateway 36 may be via any suitable RF communication technology, standard, or protocol (e.g., WIFI, IEEE 802.15.4, Bluetooth, ZigBee, etc.). Parking system 10 may also include one or more multi-space parking meter 14 in place of, or in addition to, single-space meters 12. In such an embodiment, the multi-space meter may also communicate with gateway 36 using a wireless, RF technology.

Referring to FIG. 6, another embodiment of parking system 10 is shown including a gateway 38 and a multi-space meter 40. In this embodiment, parking system 10 includes one or more stand-alone vehicle sensors, such as curb surface-mount sensor 22 and street surface-mount sensor 24, configured to monitor occupancy of the parking spaces associated with multi-space meter 40. In this embodiment, gateway 38 receives wireless communication from both single-space meters 12 and the stand-alone vehicle sensors (i.e., sensor 22 and sensor 24). Similar to the embodiment shown in FIG. 5, gateway 38 communicates information received from meters 12 and sensors 22 and 24 to parking management system 18 via wireless network 16.

Multi-space meter 40 communicates directly with parking management system 18 via wireless network 16. In this embodiment, parking management system 18 is configured to properly associate the data received from the stand-alone vehicle sensors with the data for the appropriate parking space received from multi-space meter 40.

Also as shown in FIG. 6, parking system 10 may be configured to provide compatibility between parking meters made by different companies. For example, in one embodiment, parking meters 12 may be produced by a first company or manufacturer and multi-space meter 40 may be made by a second company or manufacturer. In this embodiment, sensors 20, 22 and 24 may be compatible with meters made by different companies. Further, parking management system 18 is configured to receive, store and process data received from parking meters or vehicle sensors made by different companies. This allows current, installed single-space and multi-space meters manufactured by different companies to be upgraded to provide the wireless communications and vehicle sensing functionalities discussed herein.

As shown in FIGS. 5 and 6, gateway 36 and gateway 38 may be mounted to an existing structure to provide for unobstructed transmission of RF signals from the meters to the gateways. For example, as shown in FIG. 5, a gateway may be mounted to a sign pole, or as shown in FIG. 6, a gateway may be mounted to a light or utility pole. In other embodiments gateways 36 and 38 may be located at other locations such as a roof top, tree or other structure that allows for unobstructed RF communication from the meters or standalone vehicle sensors of parking system 10. Further, gateways 36 and 38 may be located on a structure that provides for an AC power supply to power the gateway. In one embodiment, gateways 36 and 38 may be housed within the housing of a multi-space meter or may otherwise be incorporated into the electronic system of the multi-space meter. In this embodiment, the multi-space meter acts to receive information from the single-space meters and/or stand-alone vehicle sensors and communicates the information to parking management system 18 via wireless network 16. In another embodiment, gateways 36 and 38 may be mounted to and supported by the multi-space meter, for example by coupling the gateway housing to the exterior of the multi-space meter housing.

Figure 7:
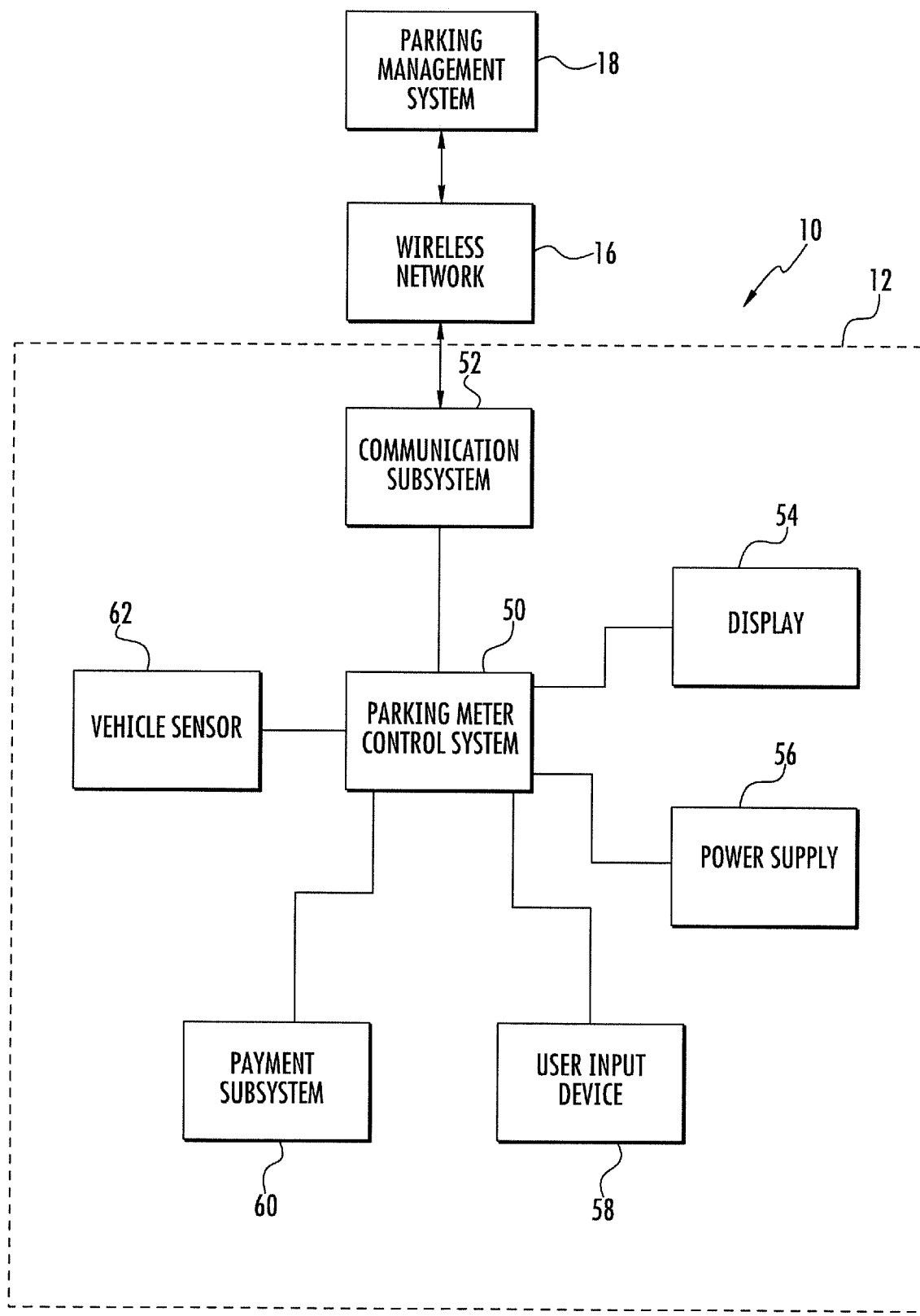
FIG. 7 is a block diagram of a parking system according to an exemplary embodiment.

Referring to FIG. 7, a block diagram of parking system 10, is shown according to an exemplary embodiment, including a single-space parking meter 12. It should be understood that parking system 10 may include a plurality of single-space parking meters 12 and one or more multi-space meters as discussed above. As shown in FIG. 7, parking meter 12 includes a parking meter control system 50, a communication subsystem 52, a display 54, a power supply 56, a user input device 58, a payment subsystem 60 and a vehicle sensor 62. Parking meter control system 50 is communicably coupled to communication subsystem 52, display 54, power supply 56, user input device 58, payment subsystem 60 and vehicle sensor 62. Parking meter control system 50 may generally be any electronic control unit suitable to provide the various parking meter functionalities discussed below. For example control system 50 may include one or more processing circuits having hardware (e.g., processors, memory, communication interfaces, etc.) and/or software configured to control the operation of parking meter 12 as discuss herein. In one embodiment shown below in FIG. 13, control system 50 includes two processors that each control various device of meter mechanism 72.

Communication subsystem 52 includes hardware and/or software for communicating data between parking meter control system 50 and parking management system 18 via wireless network 16. As shown in FIG. 1 communication subsystem 52 may be a communication subsystem associated with a single-space parking meter 12 that is configured to communicate data between the associated meter and parking management system 18 via wireless network 16 utilizing standard mobile telephone communication systems (e.g., GSM, GPRS, EDGE, etc.). As shown, in FIGS. 5 and 6, communication subsystem 52 may include RF communication hardware and software physically coupled to single-space parking meter 12 and/or associated with a stand-alone vehicle sensor and a gateway, such as gateway 36 and 38. In this embodiment, data is communicated from single-space meter 12 or from the stand-alone vehicle sensor to the gateway and the gateway communicates the information to parking management system 18. In one embodiment, communication subsystem 52 includes a wireless communication antenna that is supported, and may be directly supported, by the inner housing of the electronic meter mechanism.

Single-space meter 12 also includes a display 54 that displays various parking related information (e.g., parking rate, current time and date, time remaining on meter, a meter expired message, user operation instructions, hours of meter operation, etc.) to the user of single-space meter 12. Display 54 may be a graphical high contrast, low power display. The display may be color or monochrome. Display 54 may be an LED display or LCD display. In the embodiment shown best in FIGS. 22 and 24, display 54 includes both a front facing screen on the sidewalk facing side of the meter and a rear facing screen on the street facing side of the meter.

Single-space meter 12 also includes a power supply 56 suitable to power the functions of single-space meter 12 discussed herein. In one embodiment, power supply 56 may include one or more solar cells or solar panels and one or more self-sustained energy storage devices (e.g., rechargeable batteries, ultracapacitors, etc.). In other embodiments, power supply 56 may be wired AC power supply. In one embodiment, single-space meter 12 may be configured to communicate power supply data wirelessly to parking management system 18 via the meter's wireless communication hardware. Power supply data may include data related to a battery and/or solar cell of the meter (e.g., battery charge rate, remaining battery charge, remaining battery life, real-time current supplied by solar cell, average current supplied by solar cell, resistance at various sections within the power supply, error messages indicating battery failure, error messages indicating solar panel failure, real-time power consumption, average power consumption, etc.). In one embodiment, single space meter 12 and/or electronic meter mechanism 72 may include one or more sensors configured to detect vandalism. In such embodiments the vandalism sensors may be associated with the electronic meter mechanism, the outer housing of the meter, the meter pole and/or the sensor housing. In various embodiments, the vandalism sensors may be configured to detect a strong impact (such as a hit from a crowbar) or the insertion of a tool into the coin slot or key hole associated with the meter. In various embodiments, the vandalism sensor may include or more of a vibration sensor, an acceleration sensor, optical sensors and/or acoustic sensors.

Single-space meter 12 also includes a user input device 58 that allows the user to interact with and operate the meter. In one embodiment, user input device 58 is a four button keypad that provides tactile feedback and/or audible feedback to the user. Single-space meter 12 also includes a payment subsystem 60 configured to receive and process payment for parking. In one embodiment, payment subsystem 60 includes currency reader (e.g., a money or coin slot and a money detector, a bill slot and bill detector, etc.), a credit-card, mag-strip reader, a smart card reader, and/or a "pay by phone" system. Further, single-space meter 12 also includes a vehicle sensor 62 (e.g., pole-mount vehicle sensors 20, curb surface-mount sensor 22 and street surface-mount sensor 24 as shown in FIGS. 1, 5 and 6, and/or sensor 28 shown in FIG. 4) that communicates information to control system 50 regarding an aspect of a vehicle in the parking space associated with meter 12.

Figure 8A:
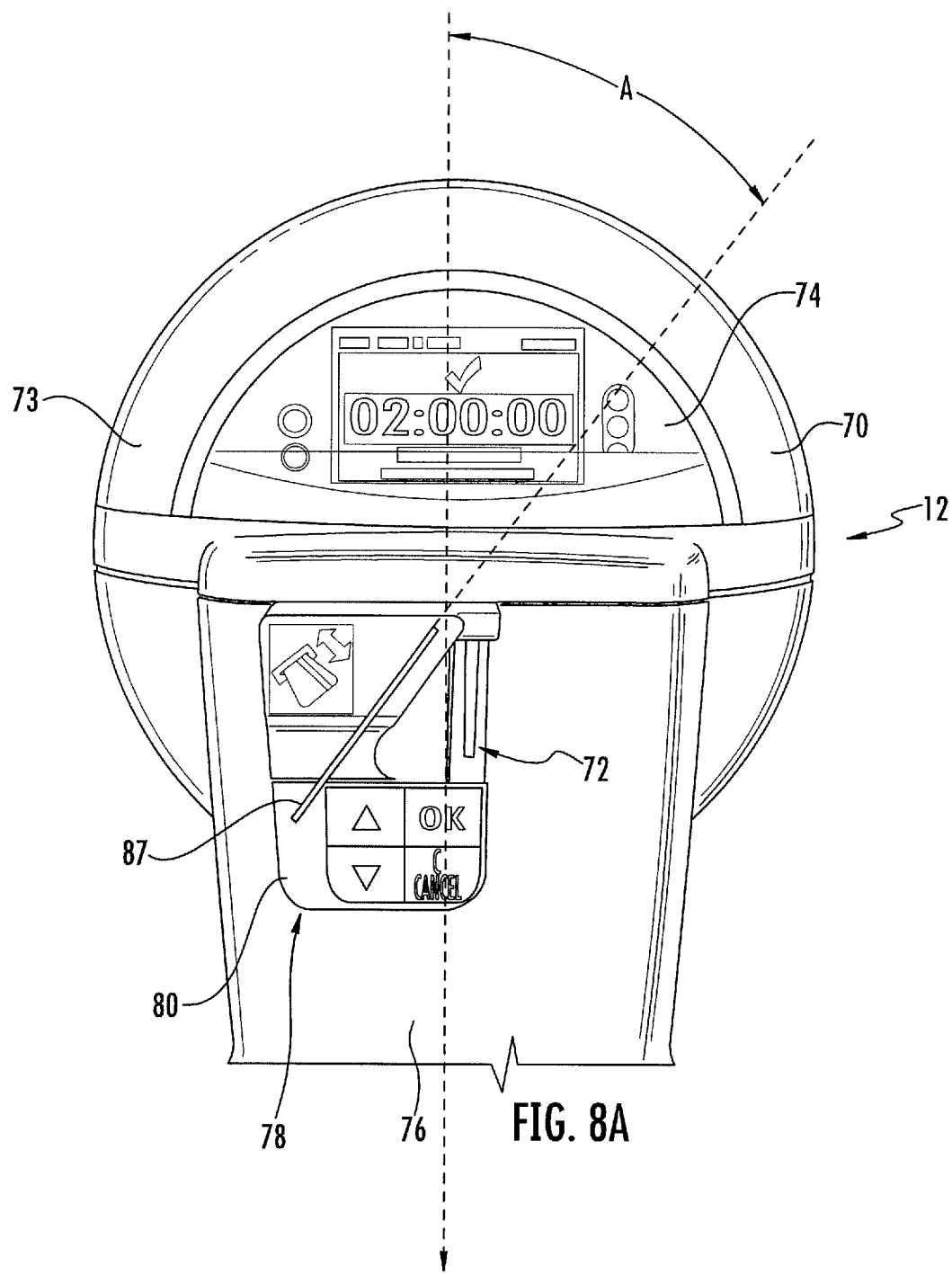
FIG. 8A is a front view of a single-space parking meter according to an exemplary embodiment.
Figure 8B:
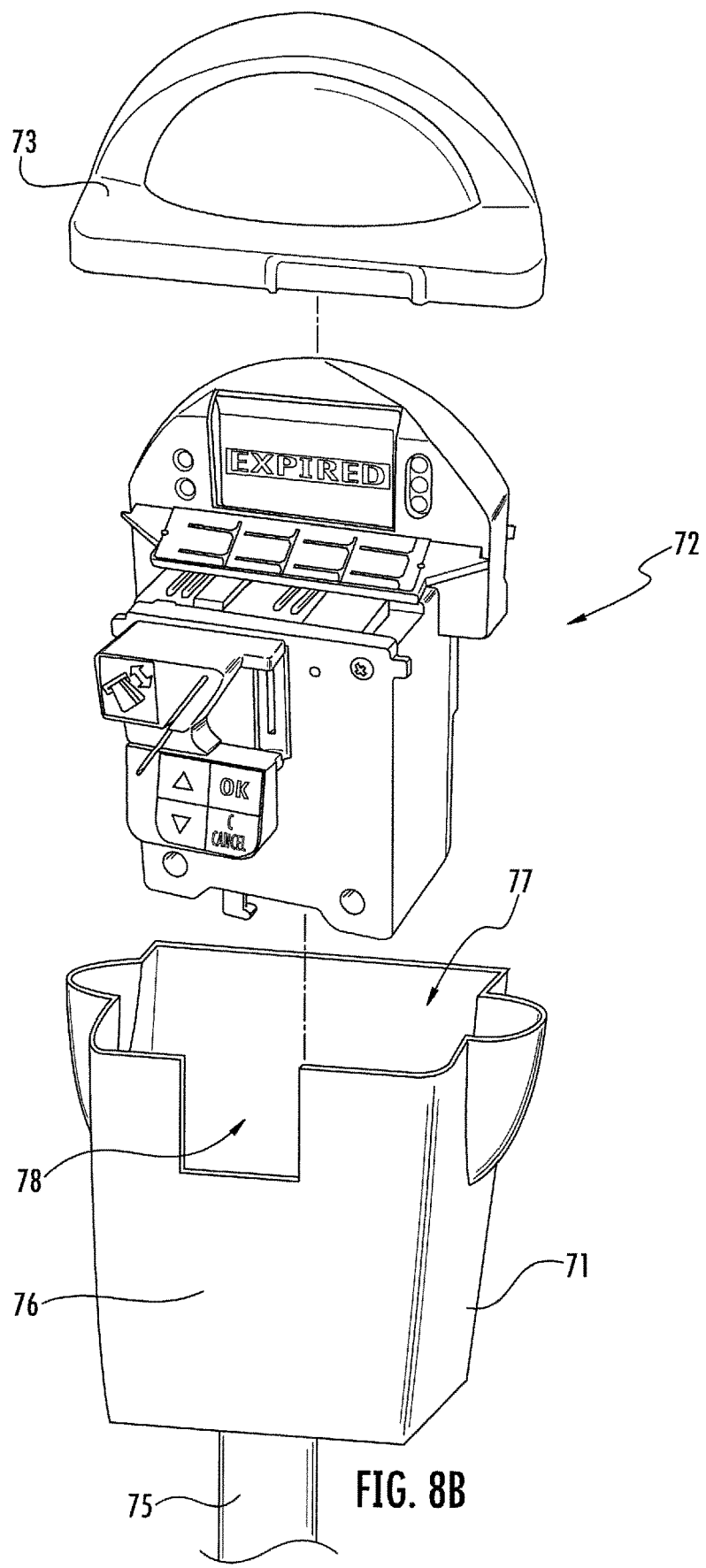
FIG. 8B is an exploded view of a single-space parking meter according to an exemplary embodiment.

Referring to FIGS. 8A, 8B, 9 and 22-24, single-space meter 12 is shown according to an exemplary embodiment. Referring to FIGS. 8A and 8B, single-space meter 12 is shown according to an exemplary embodiment. Single-space meter 12 includes an outer housing 70 and an electronic meter mechanism 72 (shown outside of outer housing 70 in FIG. 9). Outer housing 70 acts to protect electronic meter mechanism 72 and includes a locking mechanism to prevent unwanted access to meter mechanism 72. Outer housing 70 includes a lower housing portion 71 and a cap portion 73. Cap 73 of outer housing 70 includes a transparent portion or window 74 which allows the user to view the display of electronic meter mechanism 72 when it is locked within outer housing 70. Lower portion 71 of outer housing 70 is coupled to an upper end of a support structure or pole 75 that supports meter 12. Lower portion 71 of outer housing 70 has an interior cavity 77 and a front (i.e., sidewalk facing) face 76 having a payment device opening, shown as an aperture 78. To assemble meter 12, electronic meter mechanism 72 is received within cavity 77 and cap 73 is coupled to lower portion 71 such that electronic meter mechanism 72 is secured within housing 70.

Referring to FIG. 9 and FIGS. 22-24, electronic meter mechanism 72 is shown outside of meter housing 70. Electronic meter mechanism 72 includes an inner housing 80 that supports the various components and electronics of electronic meter mechanism 72. Inner housing 80 is generally the shell or structure the encases and supports the electronics of meter mechanism 72. Inner housing 80 also couples to the inner surface of outer housing 70 such that electronic meter mechanism 72 may be supported by and secured to outer housing 70. As discussed above, electric meter mechanism 72 includes an electronic display screen, shown as display 54, that displays information to the user. In one embodiment, display 54 includes a first screen viewable from the front of meter mechanism 72 and a second screen viewable from the rear of meter mechanism 72.

Generally, meter mechanism 72 includes a payment receiving structure including one or more payment devices configured to receive payment from a motorist (e.g., a credit card reader, a currency reader, a smart card reader, etc.). In addition, meter mechanism 72 includes a user input device (e.g., a keypad, touch screen, buttons, switches, etc.) that receives inputs from the motorist in order to operate the parking meter. Typically, the payment receiving structure and the user input device is located on the front side of the inner housing such that the motorist is located on the sidewalk when applying payment to the meter or interacting with the user input device.

Figure 9:
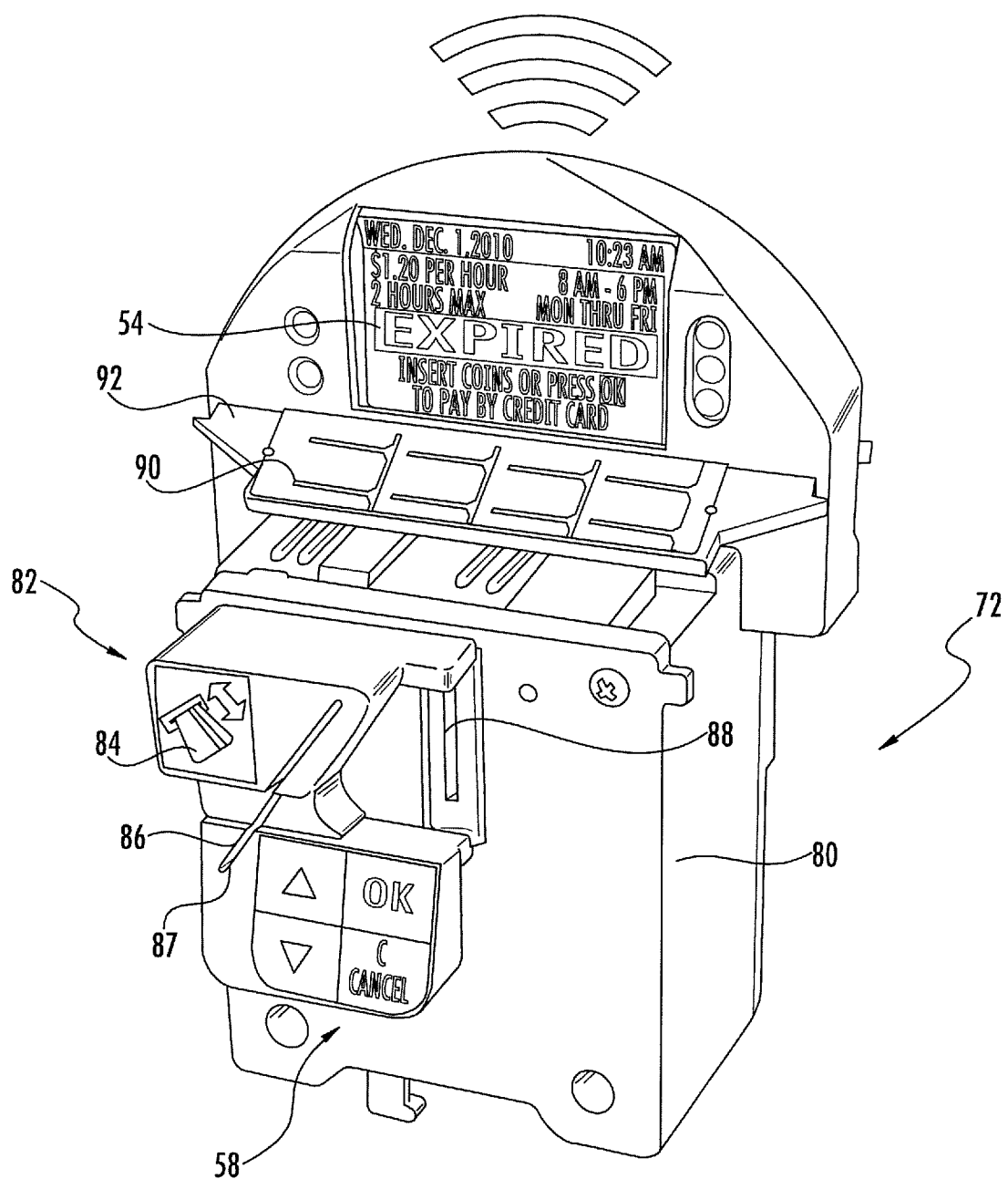
FIG. 9 is a front view of an electronic meter mechanism according to an exemplary embodiment.

The exemplary embodiment of electronic meter mechanism 72 shown in FIG. 9 includes an integrated payment and user-interface structure 82 that extends outward from the front side of inner housing 80. Structure 82 includes both at least the physical, payment receiving components of both the payment subsystem 60 and the user input device 58. Structure 82 is an extended portion of the housing that supports both the payment receiving structure and the user input device of meter mechanism 72. In the embodiment shown, user input device 58 is a four button interface including up and down arrow keys, an OK button and a cancel button. Payment subsystem 60 includes a hybrid card reader including both a smart card reader 84 and a credit card mag strip reader 86. Payment subsystem 60 also includes a money slot, shown as coin slot 88, and located within structure 82 is a currency reader that detects currency (coins in the example shown) that passes through coin slot 88. In other embodiments, the money slot and currency reader may be configured to accept and detect paper money. Smart card reader 84 may be configured to read a variety of smart-card type payment cards, for example, smart-card credit cards, smart-card debit cards, proprietary parking payment smart cards, etc. Credit card reader 86 may be configured to read a variety of mag-strip based payment cards, including, mag-strip credit cards, mag-strip debit cards, proprietary parking mag-strip payment credit cards, etc. In another embodiment, payment subsystem 60 also includes an RF based payment system configured to read an RFID tag associated with the vehicle (e.g., iPass), and to process a parking payment to a pre-registered account associated with the vehicle's RFID tag.

Figure 22:
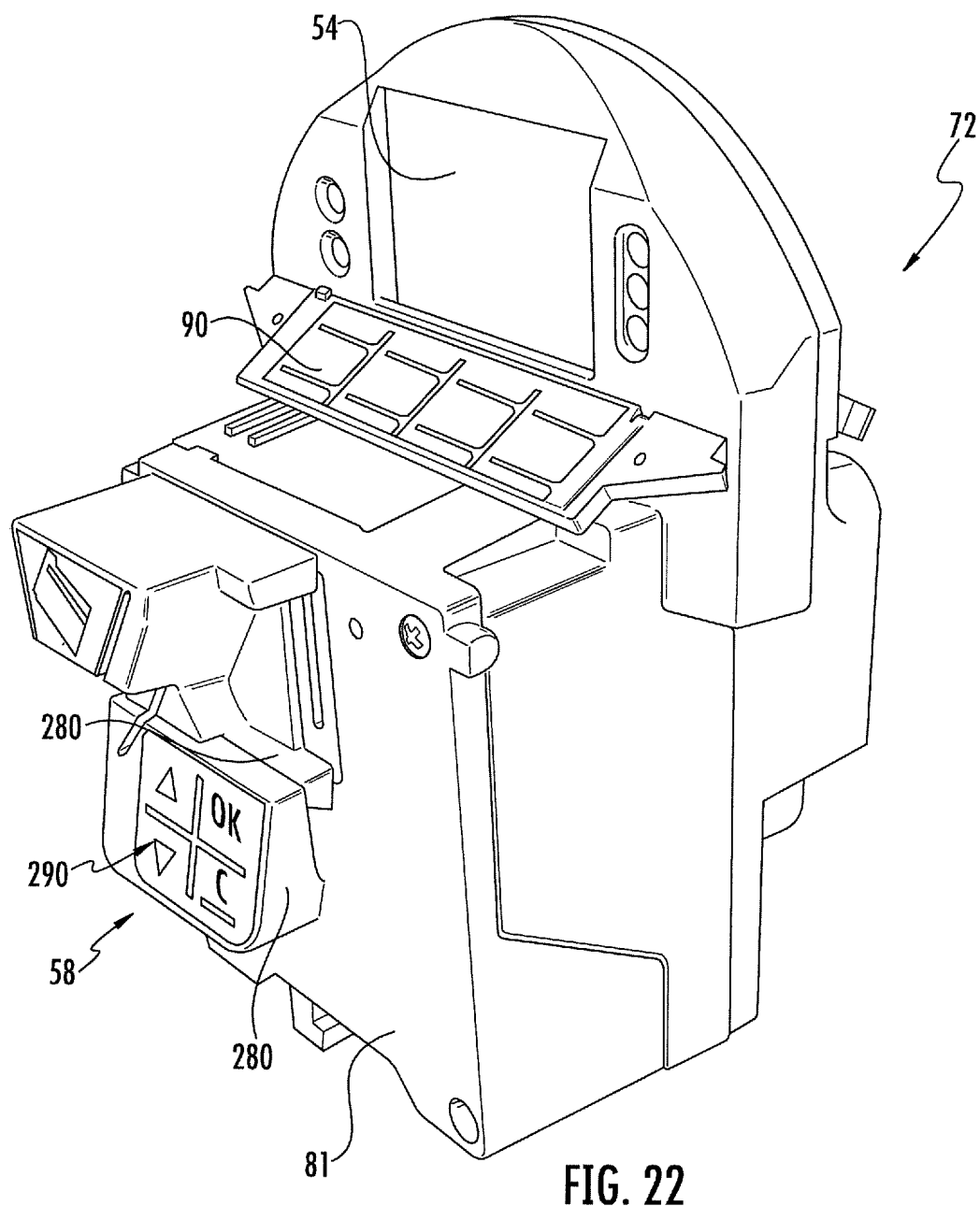
FIG. 22 is a front view of an electronic meter mechanism according to an exemplary embodiment.
Figure 23:
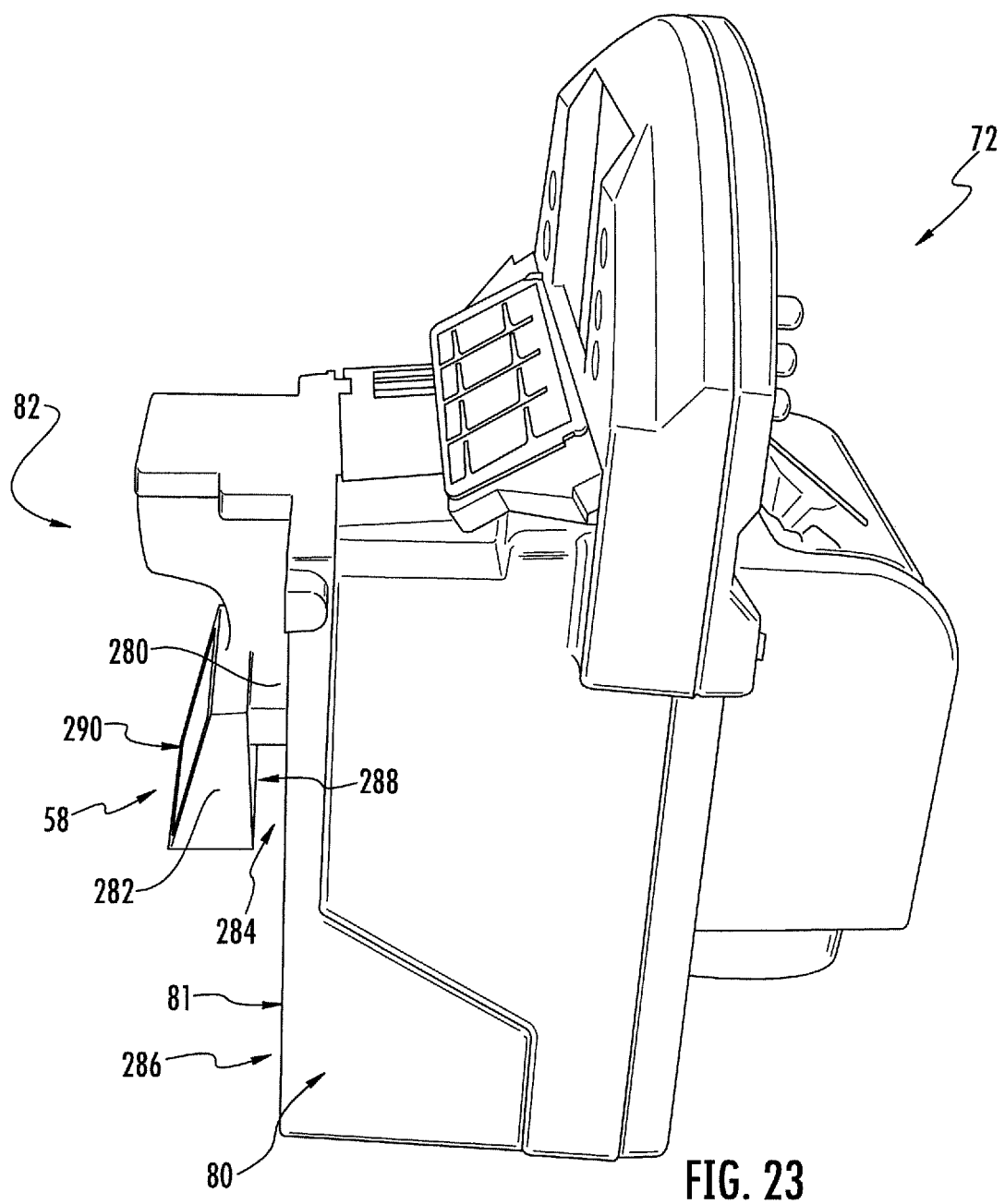
FIG. 23 is a side view of an electronic meter mechanism according to an exemplary embodiment.

As shown best in FIGS. 22 and 23, inner housing 80 includes a first arm or portion 280 and a user input housing, shown as keypad housing 282. Arm portion 280 extends substantially perpendicular from the front face of inner housing 80, and keypad housing 282 is coupled to the front edge of portion 280 and extends downward away from portion 280. The keys of the keypad form the front face of keypad housing 282. As shown in FIG. 9, the keys of user interface 58 are located below the coin slot 88 and is located below a majority of the credit card slot of credit card reader 86.

A gap 284 (shown best in FIG. 23) is formed between the front surface 286 of inner housing 80 and the rear surface 288 of keypad housing 282. When electronic meter mechanism 72 is mounted to outer housing 70, the front surface of outer housing 70 below aperture 78 is received within gap 284 such that integrated payment and user-interface structure 82 extends through outer housing 70 (as shown in FIGS. 8A and 8B). This arrangement may help to secure meter mechanism 72 to housing 70 and may help to properly locate electronic meter mechanism 72 relative to the outer meter housing during installation. In one embodiment, the length of arm portion 280 is such that rear surface 288 of keypad housing 282 is in contact with and flush against the front surface of outer housing 70 below aperture 78 when meter mechanism 72 is within housing 70. As shown in FIG. 23, the portion of integrated payment and user-interface structure 82 that includes the mag-strip reader of credit card reader 86 extends outward from front face 286 of inner housing 80 beyond key pad 58. The extended length of the housing portion that supports mag-strip reader of credit card reader 86 in the direction perpendicular to the front face of inner housing 80 provides sufficient length to allow full insertion of a credit card into the credit card reader. This relative sizing allows meter mechanism 72 to include an upgraded payment system (e.g., one including a credit card reader) and to be installed in a preexisting outer meter housing 70.

Referring to FIG. 9, credit card reader 86 includes a slot 87 formed in the front face of structure 82. Slot 87 provides the entrance that allows a credit card to be inserted into and to be read by the mag-strip reader of credit card reader 86. As shown, slot 87 is angled at an angle A relative to the vertical axis of the front face of structure 82. In the embodiment shown, slot 87 is angled such that the upper end of the slot is located laterally inward from the lower end of the slot. Slot 87 extends downward and laterally outward from its upper end to its lower end. In various embodiments, angle A is between 30 degrees and 80 degrees, preferably between 40 and 70 degrees and more preferably between 50 and 60 degrees. In one specific embodiment, angle A is about 55 degrees (e.g., 55 degrees plus or minus half a degree). As shown in FIG. 9, slot 87 extends below and laterally to the outside of the upper edge of the keypad. In other embodiments, slot 87 may angled in the opposite direction such that the upper end of the slot is located laterally outward from the lower end of the slot. Because the length of slot 87 is determined by the size of the type of credit card to be read, angling slot 87 allows for conservation of space on the front face of structure 82.

Referring back to FIG. 8A, with electronic meter mechanism 72 located within outer housing 70, the payment-user interface structure 82 of electronic meter mechanism 72 extends through aperture 78 such that the user can interact with the payment systems and the user interface. As shown in FIG. 22, front facing surface 290 of keypad housing 282 includes the buttons of user interface 58. As shown in FIG. 23, front facing surface 290 is at an angle relative to surface 286 and to the vertical plane defined by display 54, such that front facing surface 290 is facing slightly upward.

Referring to FIG. 9 and FIG. 22, electronic meter mechanism 72 includes a front solar panel 90 that provides power to operate electronic meter 72 and to charge a rechargeable battery located inside inner housing 80. Inner housing 80 includes a front support, shown as front shelf 92, upon which front solar panel 90 is mounted. Further, shelf 92 extends from the front surface (i.e., the sidewalk facing surface) of inner housing 80 and is positioned below (i.e., at a lower position as measured along the vertical axis of the meter mechanism) display 54 such that shelf 92 is located below window 74 of outer housing 70. In this embodiment, shelf 92 is also located above structure 82. In the embodiment shown, shelf 92 is coupled to the front side of inner housing 80 at a position substantially underneath (i.e., at a position below along the same vertical axis) display 54. This arrangement allows electronic meter mechanism 72 to be mounted inside outer housing 70 while allowing sunlight to strike front solar panel 90. Thus, this positioning of solar panel 90 allows meter mechanism to be installed into a pre-existing meter housing in a configuration that allows sun light to reach panel 90 after the meter mechanism is secured within outer housing 70. In one embodiment, shelf 91 and solar panel 90 are positioned relative to the windows in the meter housing cap to maximize solar irradiance during normal operation.

Figure 24:
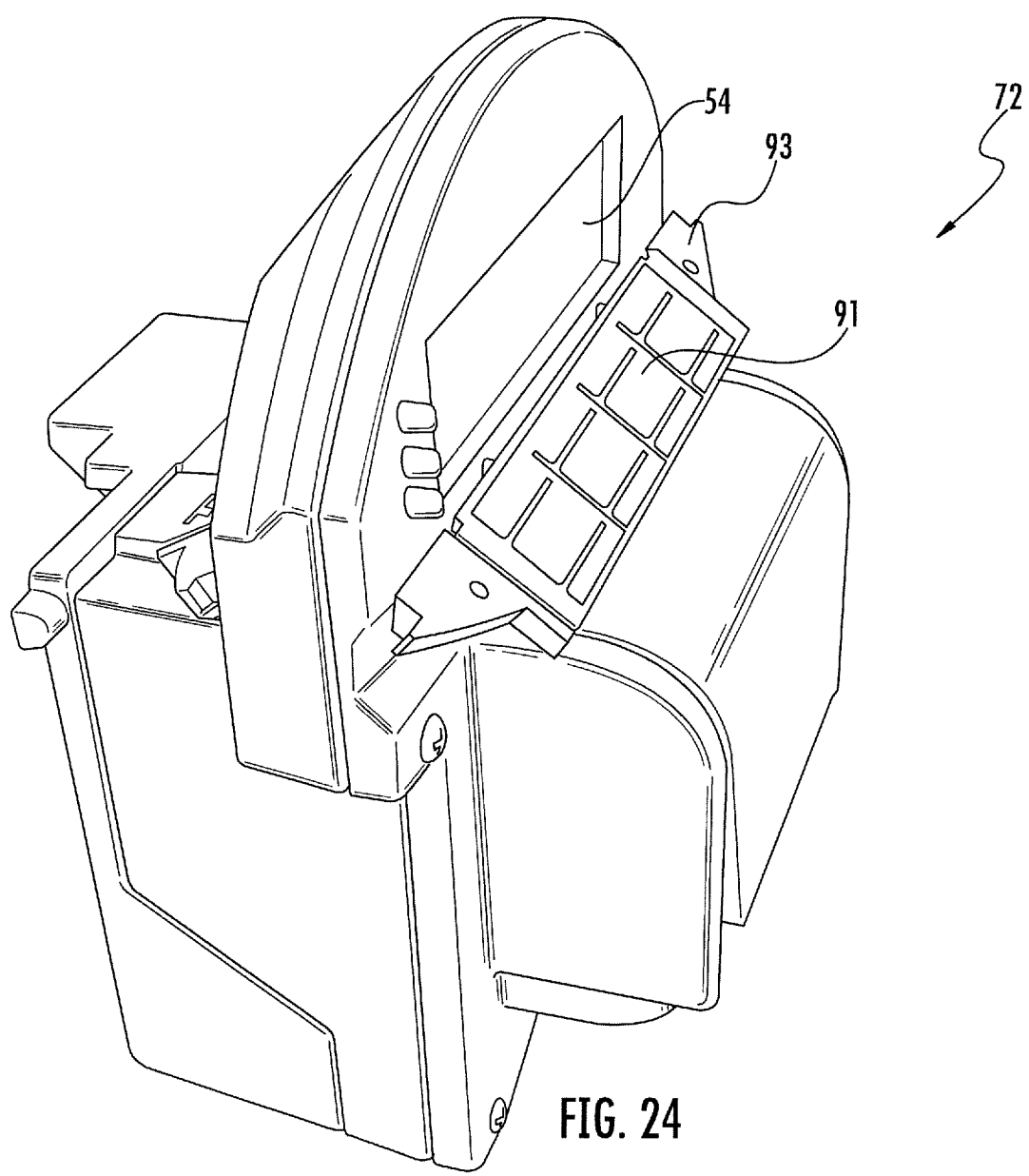
FIG. 24 is a rear view of an electronic meter mechanism according to an exemplary embodiment.

As shown in FIG. 24, electronic meter mechanism 72 also includes a rear solar panel 91. Rear solar panel 91 is mounted to a rear support, shown as rear shelf 93, which extends from a rear surface of inner housing 80 at a position below display 54. As explained in more detail below regarding FIG. 25 and FIG. 26, rear solar panel 91 is also mounted to inner housing 80 such that light may pass through a rear window in meter housing 70 to strike rear solar panel 91. In other embodiments, electronic meter mechanism 72 may include one solar panel or more than two solar panels.

Both solar panel support shelves 92 and 93 extend outward away from display 54 and downward toward structure 82 and toward the lower edge of the meter housing. This arrangement is such that the upper surfaces of shelves 92 and 93 are angled (e.g., are non-horizontal, are not perpendicular to a vertical axis, etc.) such that the surfaces of both shelves face upward and outward away from display 54. This positioning provides mounting surfaces for solar panels 90 and 91 that facilitate capture of light through the windows 74 of outer housing 70.

As noted above, electronic meter mechanism 72 also includes display 54. Display 54 may be a backlit high-contrast display supporting the display of both text and graphics. Display 54 may be a monochrome display or a color display. As shown in FIG. 9, display 54 is supported by inner housing 80 at a position above (i.e., at a higher position as measured along the vertical axis of the meter mechanism) payment and user interface structure 82. As shown in FIG. 9, display 54 includes a left edge and a right edge, and in the embodiment shown, display 54 is rectangular having upper and lower edges perpendicular to both the left and right edges. In one embodiment, the width of solar panels 90 and 91 is greater than the width of display screen 54 such that the left and right lateral edges of solar panels 90 and 91 extend laterally beyond the left and right edges of display 54, respectively.

Electronic meter mechanism 72 is configured to provide wireless communication from the meter to parking management system 18. In one embodiment, electronic meter mechanism 72 may include cellular communications hardware (e.g., GPRS modem, antenna, etc.) located within and/or coupled to inner housing 80. In another embodiment, electronic meter mechanism 72 includes RF communications hardware (e.g., point-to-multipoint RF modem, antenna, etc.). In another embodiment, electronic meter mechanism 72 includes both cellular communications hardware and RF communications hardware allowing the mechanism to be incorporated into either systems using a gateway or using direct meter cellular communications. In other embodiments, electronic meter mechanisms 72 within parking system 10 may be configured to utilize multi-point to multi-point or mesh networking communication systems. In such embodiments, electronic meter mechanisms 72 may be configured to connect to a primary gateway. In one such networked embodiment, parking system 10 may be configured to determine the shortest and/or most reliable path through one or more gateways to reach parking management system 18. In such embodiments, networked meter mechanism 72 may be configured to detect or discover those gateways that are in range. In this embodiment, a node may send a first message to discover a gateway, and the gateways within range may respond back at random intervals within a predetermined time window. The node will then evaluate the link to the gateway and through the gateway (or gateways) to assess and select the shortest and/or most reliable path to the server.

Figure 10:
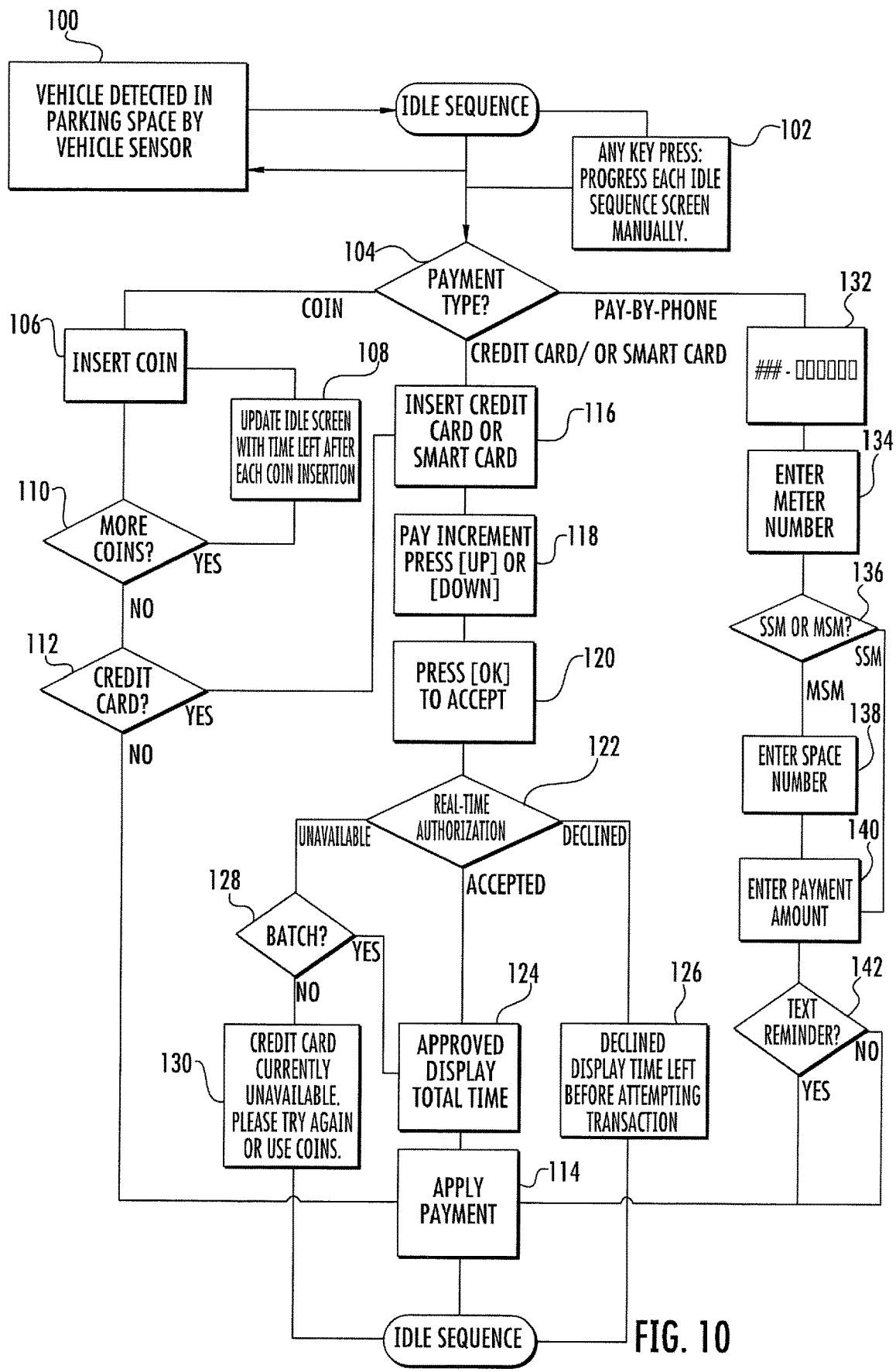
FIG. 10 is a flow diagram showing the operation of a parking meter according to an exemplary embodiment.

Parking system 10 may utilize the vehicle sensing features and the communication features described above to provide for various automated and real-time parking system functions. FIG. 10 is a flow diagram showing the operation of single-space meter 12 and display 54 by the meter controller and parking management system 18 during the payment sequence of the parking meter. In one embodiment as shown in FIG. 10, parking system 10 may be configured to automatically initiate the beginning of the payment sequence and the display of the appropriate instructions on display 54 based upon detection of a vehicle within the parking space by the vehicle sensor.

Referring to FIG. 10, at step 100, if a vehicle is detected by the vehicle sensor, a signal is communicated from the sensor to the meter controller (e.g., parking meter control system 50), and the meter controller initiates display of the payment instructions. Alternatively, if at step 102, a user input is received by the user input device of the parking meter, the meter controller also initiates display of the payment instructions. At step 104, the meter displays a message asking the user to select the type of payment the user wishes to use. In the embodiment of FIG. 10, the user may select payment by coin, payment by credit card, payment by smart card or pay-by-phone options. The user may select the method of payment by interacting with the user interface to select the desired payment type from a menu shown on the meter display. The user may also select the method of payment by directly using one of the payment devices of the meter without first making a selection via the user input device. For example, the user may select the payment method by swiping a credit card or by inserting coins into the coin slot. In one embodiment, parking meter control system 50 is configured to allow a vehicle to park in the space associated with the meter for a set "grace period" prior to moving to step 104. In this embodiment, parking meter control system 50 is configured to allow a set amount of free parking time prior to requiring payment to be applied to the meter. In one embodiment, free time (e.g., 15 minutes, 20 minutes, 30 minutes, etc.) may be automatically applied to the meter when a vehicle is detected in the parking space by a vehicle sensor at step 100. In this embodiment, the motorist may add additional time via payment as discussed below.

As shown in the remainder of FIG. 10, based on the user's payment type selection, the meter displays instructions for the selected payment type, and the user follows the instructions to put the appropriate amount of time on the parking meter, and the meter processes the payment received by the user to apply the payment to the meter. Specifically, the user or motorist may insert coins, and at step 106, the single-space meter detects the coins added to the meter. At step 108, the meter control system adds the appropriate amount of time for the coins deposited to the meter and displays the amount of time on the screen. At step 110, the single-space meter detects whether additional coins have been added and if so the meter time is updated as needed. At step 112, the single-space meter detects whether user has attempted to add time using one of the other payment methods, and if so, the payment processing for a smart card or credit card is conducted. If no additional payment is detected, the payment is applied to the meter at step 114 and the single-space meter monitors the time remaining on the meter and awaits for input.

The motorist may add time to the meter using a credit card, and at step 116, the single-space meter detects whether a credit card has been inserted into the credit card reader. At step 118, the meter prompts (e.g., by the display of instructions on screen 54) the user to use the up and down arrow keys to select the amount of time the user wishes to add to the meter. When the appropriate amount of time is added to the meter, the single-space meter detects the user's activation of the enter or OK button, at step 120. At step 122, the single-space meter submits the transaction data for authorization of the credit card. If the credit card payment is accepted, at step 124, the total time added to the meter is displayed, and the payment is applied to the meter at step 114 and the single-space meter monitors the time remaining on the meter and awaits for input. At step 126, if the credit card traction is declined, the meter displays an indication that the credit card payment was not accepted and displays the current time remaining on the meter if any. If real-time authorization of the credit card is not available, at step 128, the meter determines whether hatching of the credit card transaction is available. If batching is available, at step 124, the total time added to the meter is displayed, and the payment is applied to the meter at step 114 and the single-space meter monitors the time remaining on the meter and awaits for input. If batching is not available, the meter displays a message that credit card payment is unavailable at step 130.

At step 104, the user may select the pay by phone options, and the meter displays instructions to the motorist regarding payment by phone. At step 132, the payment by phone number is displayed to the motorist. At step 134, the meter number is entered, and at step 136, the communication type is determined. If MSM communication is selected, at step 138 the space number is entered. At step 140, the user is prompted to enter the amount of time to be added to the meter, and the payment is applied to the meter at step 114 and the single-space meter monitors the time remaining on the meter and awaits for input. At step 142, the user may selected whether receive text reminders indicating the amount of time left on the meter.

Figure 11:
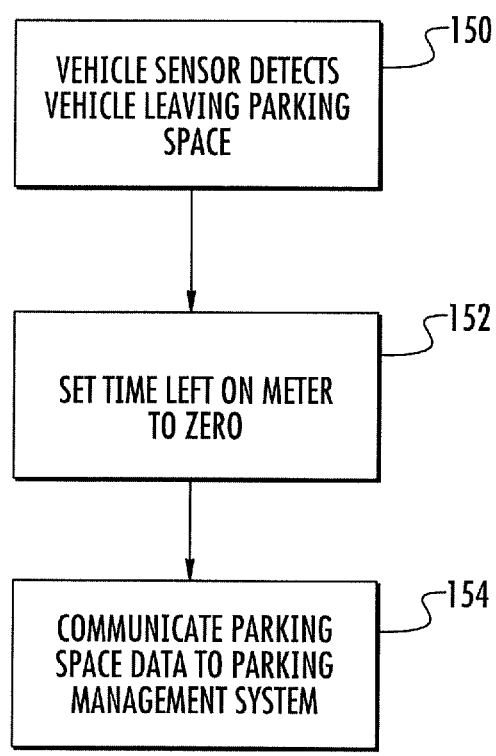
FIG. 11 is a flow diagram showing zeroing of a parking meter according to an exemplary embodiment.

In various embodiments, the vehicle sensor is configured to communicate a signal to the meter controller indicative of whether a vehicle has left the parking space. In one such embodiment shown in FIG. 11, at step 150 the vehicle sensor associated with a parking spot detects that the current vehicle is leaving the parking space. At step 152, the time remaining on the meter for the parking spot is set to zero by the controller after the current vehicle leaves the parking space. Zeroing the time on the meter when the current vehicle leaves the parking space may lead to an increase in parking revenue by preventing a subsequent parker from utilizing meter time from a previous parker.

In one embodiment, the parking meter may be a single-space meter, and the signal indicative of the vehicle leaving the parking spot is communicated to the parking meter control system associated with that meter. When the signal indicating vehicle departure is received from the vehicle sensor, the parking meter control system zeros out the display of remaining time on the meter. As noted above, in one embodiment, the vehicle sensor is physically coupled to the meter or the meter pole and communicates the signal via a hardwired connection to the single-space meter controller.

In another embodiment, the vehicle sensor may be a stand-alone vehicle sensor associated with a multi-space meter, and in this embodiment, the signal indicative of the vehicle leaving the parking spot may be communicated to the parking meter control system associated with the multi-space meter. In this embodiment, the controller of the multi-space meter may zero out the time associated with the parking spot. In another embodiment, the vehicle sensor may communicate the signal indicative of the vehicle leaving the parking spot directly to the parking management system. In this embodiment, the time associated with the parking space as maintained by the parking management system may be set to zero. Further, the parking management system may transmit a signal to the multi-space meter indicating that the time associated with the parking space should be set to zero.

At step 154, the parking meter control system communicates parking space data to the parking management system. The parking space data communicated to the parking management system may include various parking space information including information related to vehicle departure, information indicating a vacant parking space, information indicating that no time is left on the meter, information indicating the length of time that the vehicle was parked in the parking spot, etc. This data may be utilized by the parking management system (e.g., parking management system 18) to provide the various functions discussed herein.

Figure 12:
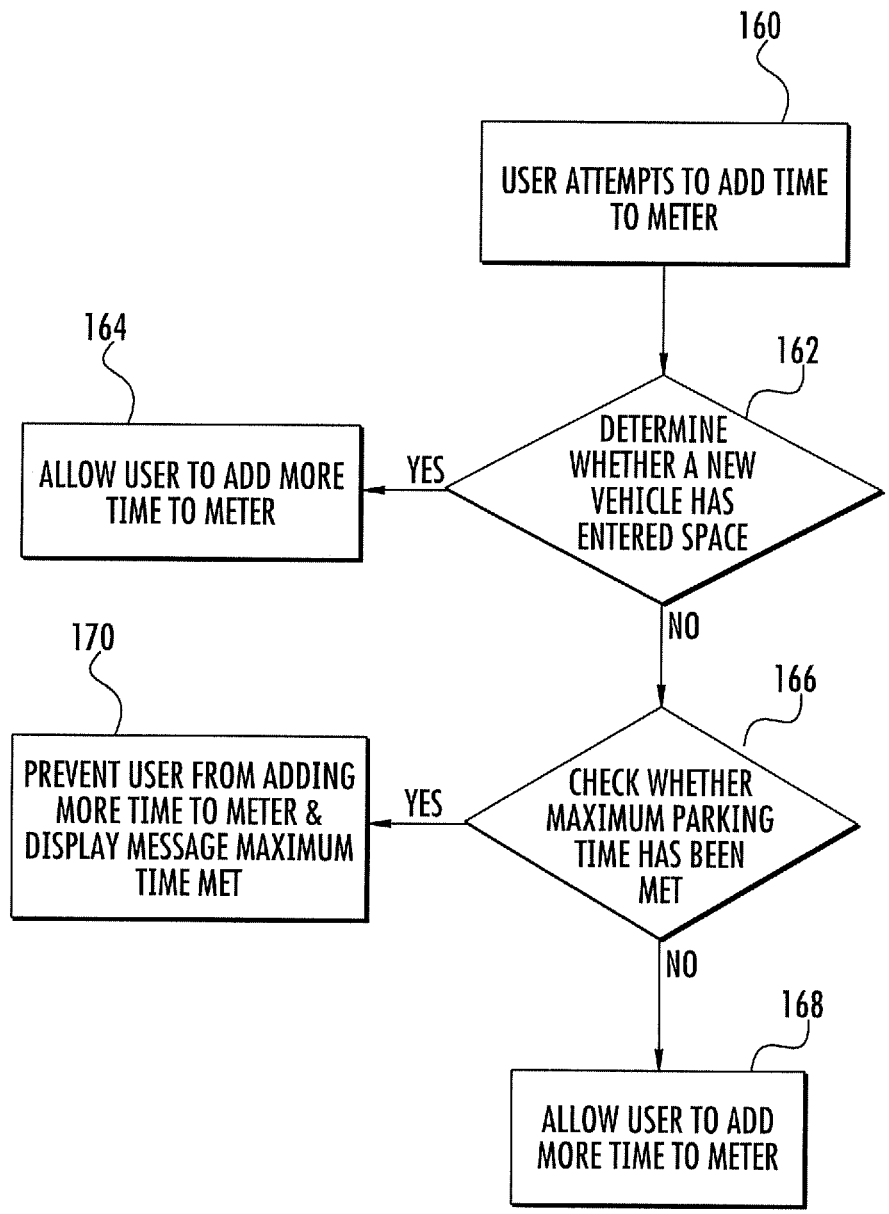
FIG. 12 is a flow diagram showing control of parking meter including a maximum time limit according to an exemplary embodiment.

In one embodiment, parking system 10, either through local processing of parking data at meters 12 or 14 or through centralized processing at parking management system 18, is configured to utilize parking data to enforce maximum parking time limits. Referring to FIG. 12, a flow-diagram of a process for the enforcement of a maximum parking time limit is shown. The process shown may be performed either by local processing of data at the control system of the single-space or multi-space meter or by centralized processing of data by the parking management system.

At step 160, the control system receives a signal indicating that a user is attempting to add additional time to the parking meter using one of the payment methods discussed above. At step 162, a determination is made regarding whether a new vehicle has entered the parking space. Step 162 may be performed in various ways. For example, when a vehicle enters the parking space, the vehicle sensor may detect the entry of a vehicle into the parking space and transmit this information to meter control system 50 which stores the entry information, and, when the current vehicle leaves the parking space, the vehicle sensor may sense the vehicle leaving the space and transmit the exit information to meter control system 50. When a user attempts to add money to the meter, the control system checks to determine whether exit information has been received and stored. If it has, it is determined that a new vehicle is located in the parking spot, and at step 164, the user is allowed to add time to the parking meter.

If no exit data has been received from the vehicle sensor, the control system determines that the same vehicle has remained in the parking spot and proceeds to step 166. At step 166, the amount of time that the current vehicle has been parked in the parking spot is determined and is compared to the maximum permitted parking time for the meter. If the current parking duration does not exceed the maximum permitted parking time for the parking space, the process moves to step 168 and the user is allowed to add time to the meter. At step 170, if the current parking duration does exceed the maximum permitted parking time, the parking meter will not accept additional payment and will not add additional time to the meter. Further at step 170, a message may be displayed to the user via display 54 indicating that the maximum permitted parking time has been met.

As noted above, parking system 10 gathers parking related information from each of the vehicle sensors associated with each parking space and from the parking meter associated with each parking space. This information is communicated to parking management system 18 which stores and process the parking information.

In one embodiment, parking management system 18 receives real-time parking information from each of the parking meters and each stand-alone vehicle sensor via wireless network 16. Real-time parking information includes parking space occupancy information (e.g., whether or not a particular parking space is currently occupied by a vehicle), vehicle arrival information, and vehicle departure information. Real-time parking information may also include parking meter status information, for example, information regarding whether the meter is expired, unexpired, the amount of time remaining on the meter, etc. Wireless communication between the parking management system and the field devices (e.g., the parking meters and the mobile devices carried by enforcement personnel and motorists) allows for real time parking information to be processed and deployed to provide the functionality discussed below.

In one embodiment, parking management system 18 communicates meter status information in real-time to users within the parking system. In one such embodiment, parking management system 18 transmits real-time information regarding expired, occupied parking spaces to parking enforcement personnel. The parking enforcement personnel may use the received data to issue citations, to plan a meter inspection route, etc.

In one embodiment, parking enforcement personnel receive the real-time information via wireless communication between handheld unit 34 and parking management system 18. In one embodiment, parking management system 18 may be configured to identify expired meters in real-time and to send information to a parking enforcement agent in real-time. When the parking enforcement agent receives the real-time information regarding expired meters, the parking enforcement agent may travel to the expired meter to issue a citation. In one embodiment, parking management system 18 may be configured to automatically generate a route for the parking enforcement agent to follow based on real-time identification of the location of expired meters and transmit the route information to handheld unit 34 or other mobile device used by the enforcement agent. Further, parking management system 18 may be configured to select the route based on various parameters. For example, the enforcement agent's route may be identified by parking management system 18 to maximize the number of citations issued, to minimize the route distance or to minimize the route travel time. In one embodiment, the parking enforcement agent may select the type of route they wish to follow using handheld unit 34.

Parking management system 18 may also be configured to communicate real-time meter status information to motorists to facilitate location of an unoccupied parking meter. In one embodiment, parking management system 18 is configured to communicate information indicative of unoccupied parking spaces to a personal navigation system (e.g., a mobile device utilizing map software, a vehicle having a GPS navigation system, a mobile device having GPS navigation software, etc.). The personal navigation system is configured to display the location of unoccupied parking spaces based on the real-time meter status information received from parking management system 18. For example, a listing of unoccupied parking spaces may be displayed and/or the location of the unoccupied parking spaces may be displayed on the map. The user may select the desired parking space, and the personal navigation system then generates a route from the current location to the selected parking space based on the real-time meter status information received from parking management system 18. In one embodiment, the personal navigation system may utilize a user input to determine current position information. In another embodiment, the personal navigation system may be configured to automatically identify current position information by accessing positioning information, such as GPS. In one embodiment, the personal navigation system is configured to display an alert to the user if the parking space becomes occupied by another driver before the user arrives at the parking spot, and in one such embodiment, the personal navigation system may automatically reroute the user to the next nearest unoccupied parking spot based on the real-time meter status information received from parking management system 18.

In another embodiment, information indicative of unoccupied parking spaces may be aggregated based on a particular geographic area by parking management system 18. For example, the parking management system 18 may be configured to generate information of parking space occupancy for a geographic area instead of or in addition to generating the location of particular unoccupied parking spots. For example, in one embodiment, a map may be displayed by a mobile device showing the general availability of parking spaces in a given block or other area based on the geographic parking space occupancy information received from parking management system 18. In one such embodiment, the number of available parking spots in a block may be displayed on a map of the personal navigation system. In another embodiment, the number of available parking spots between two cross-streets along the person's route may be displayed based on the geographic parking space occupancy information received from parking management system 18. In another embodiment, an indication of the occupancy rate of parking spaces along the user route may be displayed based on the geographic parking space occupancy information received from parking management system 18. In one embodiment, the parking space occupancy rate may be displayed utilizing a color-coded system. For example, streets with 100% occupancy may be highlighted in red on the map display, streets with 90-99% occupancy may be highlighted in orange on the map display, streets with 75%-89% occupancy may be highlighted in yellow on the map display, and streets with occupancy under 75% may be highlighted in green on the map display.

In one embodiment, the personal navigation system is configured to display information indicative of the proximity of each identified unoccupied parking spot to the user's ultimate destination based on the real-time meter status information received from parking management system 18. For example, a listing of unoccupied spaces may be ordered by distance from the parking spot to the user's destination. In another embodiment, a display of unoccupied parking spaces on the personal navigation system map may include a display of distance information next to the location of the parking space on the map. For example, a flag display indicating the location of the unoccupied parking space may include a number indicating the distance from the parking space to the destination. In another embodiment, the flag display may include a number indicating the distance rank of each unoccupied parking space to the user's destination (e.g., 1 for first closest, 2 for second closest, 3 for third closest, 4 for fourth closest, etc.).

Parking management system 18 may also be configured to store parking information received via wireless communication from the meters of parking system 10. In other embodiments, parking information may be manually entered into parking management system 18. In another embodiment, parking information may be loaded into parking management system 18 from another data source (e.g., memory unit of handheld device 34). Parking management system 18 may include storage components and database components to store and organize the received parking information. The historic, stored parking information within parking management system 18 may be analyzed to operate or to improve operation of parking system 10.

In one embodiment, parking space occupancy information may be analyzed by parking management system 18 to adjust the parking rate of a particular meter. For example, if a meter is occupied at more than a desired level (e.g., close to 100% of the time) the parking rate of the meter may be increased, and if the meter is occupied at a less than desired level (e.g., less than 50% of the time) the parking rate may be decreased. The change in parking rate is determined by parking management system 18 and the new rate is communicated wirelessly to the meter. In one embodiment, parking management system 18 may be configured to process occupancy data to determine what parking rate would result in a desired occupancy rate. In various embodiments, the desired occupancy rate may be between 60 and 90 percent, may be between 70 and 90 percent, may be between 75 and 85 percent or may be about 80 percent. In one such embodiment, parking management system 18 may be configured to automatically process occupancy data to determine the parking rate that would result in the desired occupancy rate, and parking management system 18 may be configured to automatically communicate the determined parking rate to the parking meter thereby setting the meter's current parking rate to match the determined rate. In one embodiment, if one or more meters of meters within a geographic area are occupied at more than a desired level (e.g., close to 100% of the time), the parking rate of one or a plurality of meters within that geographic area may be increased, and if one or more meters are occupied at a less than desired level (e.g., less than 50% of the time), the parking rate of one or a plurality of meters within that geographic area may be decreased.

In certain parking systems, a single parking rate that applies to a meter all of the time may result in both periods when the occupancy rate of the spot is below the desired occupancy rate and periods when the occupancy rate of the spot is above the desired occupancy rate. In one embodiment, parking management system 18 may be configured to process occupancy data for a predetermined time period and to determine the parking rate that would result in the desired occupancy rate for the predetermined time period. In one embodiment, parking management system 18 is configured to process occupancy data for a particular predetermined time period (e.g., week day days, week day nights, weekend days, weekend nights, holidays, days or hours of special events, like sporting events, etc.) and to determine the parking rate that results in the desired occupancy rate during the predetermined time period. Parking management system 18 then communicates this information wirelessly to each meter to change the parking rate of the meter.

Further, the historical parking data may be analyzed by parking management system 18 to improve parking enforcement efforts. For example, parking management system 18 may be configured to determine if a disproportionate number of parking violations are identified historically in a particular area and/or during a particular time period, and if so, parking management system 18 provides an indication that enforcement efforts should be increased during those times. For example, the indication may be displayed data indicating where enforcement efforts should be increased. In another embodiment, parking management system 18 may automatically communicate information regarding a particular enforcement patrol route based on the analysis of historic parking data by parking management system 18. However, if a disproportionately small number of parking violations are identified during a particular time period or in a particular area, parking enforcement resources may be diverted to other areas of parking system 10 by parking management system 18. In these embodiments, parking management system 18 may be configured to process historical parking data to determine desired parking enforcement routes, to determine the number of enforcement personnel that should be assigned to a particular area during a particular time, etc.

In various embodiments, parking management system 18 may be configured to utilize wirelessly communicated payment data to provide additional functionality to parking meter system 10. In one embodiment, parking management system 18 may be configured to evaluate or analyze payment data received from single space meters 12 (e.g., data regarding payments received from credit cards, smart cards, debit cards, pay-by-phone devices, near-field-communication payment devices, etc.) to identify suspicious or fraudulent payment activity. In some embodiments, parking management system 18 may be configured to identify a payment pattern that indicates fraudulent payments. For example, parking management system 18 may be configured to identify that a particular payment device (e.g., a particular credit card, smart card, cell phone, etc.) has been used to pay for a number of meters in an irregular pattern. In such embodiments, payment devices that are associated with a fraudulent payment pattern can be flagged and added to a real-time "blacklist" maintained by parking management system 18. In such embodiments, payment approval processing performed by parking management system 18 may include comparing a payment device to devices listed on the blacklist, and subsequent payments from blacklisted payment devices can be denied. In other embodiments, parking management system 18 may maintain a list of payment devices (e.g., particular brands of credit cards, particular credit cards owned by identified individuals, etc.) that are entitled to a parking discount or free additional parking time. During payment processing by parking management system 18, an identifier associated with the payment device or the owner of the payment device may be compared against the discount list maintained by parking management system 18 and a discount applied accordingly.

Figure 13:
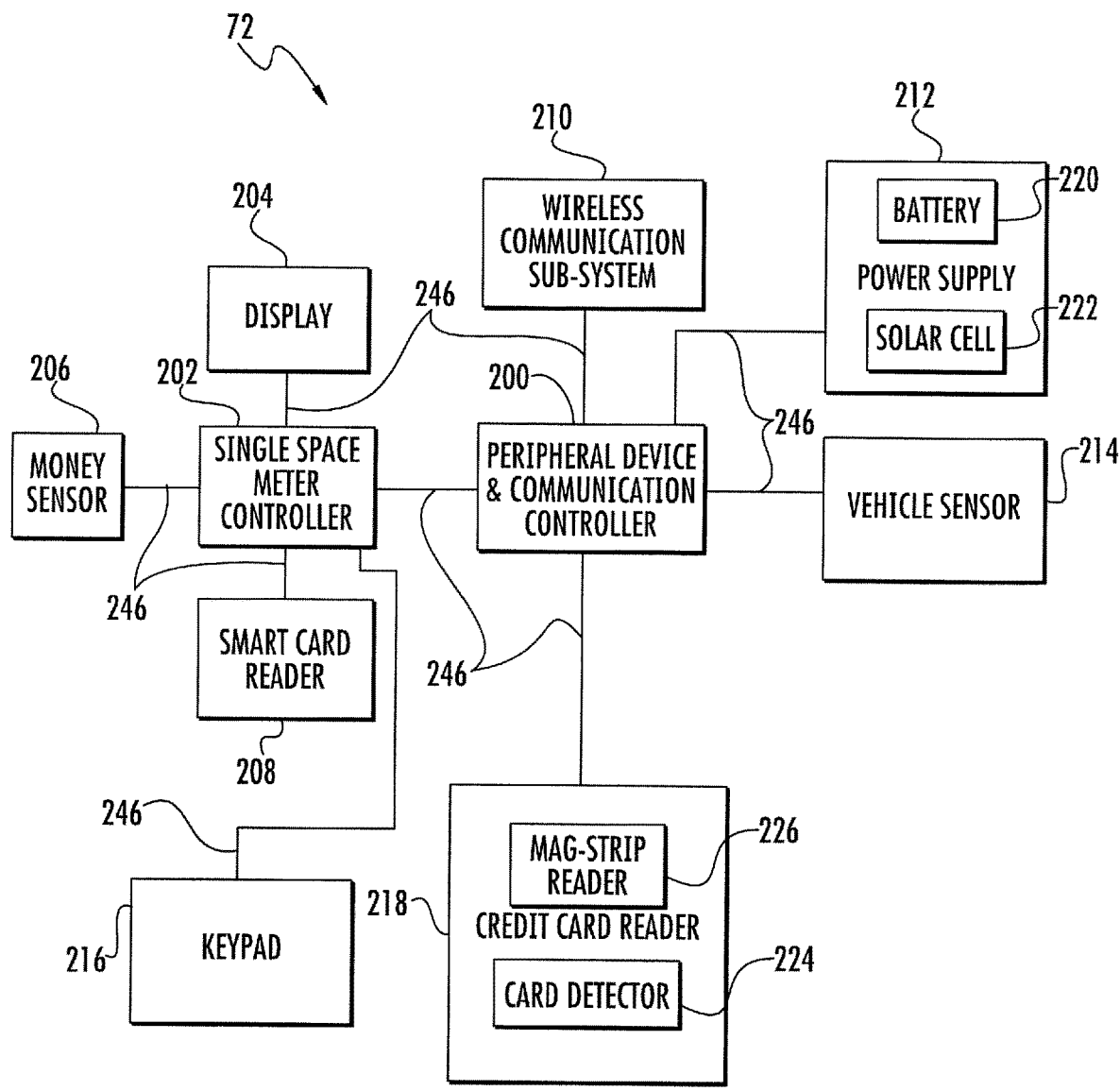
FIG. 13 is a block diagram showing an electronic meter mechanism according to an exemplary embodiment.

Referring to FIG. 13, a block diagram of electronic meter mechanism 72 is shown according to an exemplary embodiment. In this embodiment, electronic meter mechanism 72 includes two distinct processors, shown as peripheral device and communication controller 200 and single-space meter (SSM) controller 202, and the local processing and control functions of electronic meter mechanism 72 are divided between the two processors. Generally, SSM controller 202 conducts the processing for and controls the display 204, a user input device, such as keypad 216 or input device 58 shown in FIG. 9, and the time-keeping functions of the meter (e.g., determining current time remaining on meter, decreasing time remaining as time passes, increasing time remaining as payment is made, determining expiration of the meter when time expires, etc.), and communication controller 200 conducts processing for and controls wireless communication subsystem 210 and vehicle sensor 214. In addition, control of the additional components of electronic meter mechanism 72 may be split between the two processors 200 and 202 as shown below in FIG. 13.

In one embodiment, both controllers 200 and 202 are controllers specifically configured for control of certain components of a new electronic meter mechanism. In another embodiment, controller 200 is a multi-purpose or multi-use control/communication device that is communicably coupled a dedicated single-space meter controller 202 in order to supplement the functionality provided by SSM controller 202 and to equip electronic meter mechanism 72 with additional peripheral devices that are not controlled by SSM controller 202. For example, in one embodiment, SSM controller 202 is a dedicated single-space meter controller and is coupled to, interfaces and/or controls a user display 204, a money sensor 206, a smart card reader 208 and keypad 216. In one specific embodiment, SSM controller 202 is the controller present in a conventional electronic single-space parking meter and controller 200 is communicably coupled to SSM controller 202 along with additional components shown in FIG. 13 (e.g., elements 210, 212, 214 and 218) as a retrofit unit to provide additional functionality to the meter. The division of control between two processors may provide electronic meter mechanism 72 with a higher efficiency and lower power requirement, than if one single processor were used. For example, both controllers 200 and 202 have a low power state and a high power state, and the controllers are configured to be in a low power state when the devices its control are not active and in the high power state when the devices under its control are active. For example, controller 202 may transition from the low power to the high power state when data is to be received or transmitted using the wireless communications hardware. In another embodiment, single space meter controller 202 controls the lime keeping functions of single space meter 12, and controller 200 is configured to control display 204 and to receive signals from money sensor 206, smart card reader 208 and keypad 216 in addition to the management of wireless communication subsystem 210, vehicle sensor 214 and credit card reader 218, discussed herein.

SSM controller 202 controls display of information on display 204 and also receives and process input signals received from keypad 216. SSM controller 202 is configured to receive information from keypad 216. SSM controller 202 may use this data to alter the display of information on display 204 based on the user inputs and to operate the payment receipt functions of the meter. As shown in FIG. 9, keypad 216 may be a four button keypad that allows the user to operate the parking meter. In this embodiment, SSM controller 202 may communicate information received from keypad 216 to controller 200, and controller 200 may in turn communicate the information to parking management system 18 via wireless communication subsystem 210.

SSM controller 202 receives an input signal from money sensor 206 indicating when a user has placed money into the parking meter. Money sensor 206 may include an inductive coil sensor configured to detect that presence and denomination of coin placed in the coin slot of the meter. In another embodiment, money sensor 206 may be an optical sensor associated with a coin slot configured to detect the presence and the denomination of coins placed in the coin slot of the meter. In one embodiment, money sensor 206 may incorporate an inductive coin sensor to detect money entering the coin slot and an optical sensor to detect a jam or foreign object located within the coin slot. Money sensor 206 may also include an optical sensor associated with a paper money slot configured to detect the presence and the denomination of paper money placed into the paper money slot of the meter. SSM controller 202 also receives input from smart card reader 208 indicating that the user has paid for parking using a smart card.

Peripheral device and communication controller 200 may be communicably coupled to a variety of additional parking meter devices to supplement the functionality provided by SSM controller 202. In the embodiment shown in FIG. 13, controller 200 is coupled to, interfaces and/or controls a wireless communication subsystem 210, a power supply system 212, a vehicle sensor 214, and a credit card reader 218. Thus, with controller 200 coupled to SSM controller 202, electronic meter mechanism 72 is provided with the functionalities provided by wireless communication subsystem 210, power supply system 212, vehicle sensor 214, user interface keypad 216, and credit card reader 218.

Controller 200 controls wireless communication subsystem 210 to provide electronic meter mechanism 72 with wireless communication functionality. As discussed in detail above, wireless communication subsystem 210 provides the communication hardware and software that allows meter mechanism 72 to send information to and to receive information from parking management system 18. Signals indicating that payment has been received from money sensor 206 or smart card reader 208 may be communicated from SSM controller 202 to controller 200, and controller 200 may in turn communicate this information to parking management system 18 utilizing wireless communication subsystem 210. Further, controller 200 may communicate information received from power supply 212, vehicle sensor 214 and credit card reader 218 to parking management system 18 using wireless communication subsystem 210. In one specific embodiment, controller 200 may communicate data to the SSM controller 202 that indicates the receipt of a credit card payment has been received, and SSM controller 202 is configured to add time to the meter and to display additional time based upon the data related to the receipt of credit card payment.

As discussed above, wireless communication subsystem 210 may include hardware and software to communicate directly with parking management system 18 via cellular telephone communication standards. In other embodiments, wireless communication subsystem 210 may utilize an RF based communication standard to communicate with a gateway which in turn communicates with parking management system 18.

Controller 200 interfaces with power supply 212 to provide power to the components of electronic meter mechanism 72. As shown in FIG. 13, power supply 212 includes a rechargeable battery 220 and one or more solar cells or solar panels 222 (e.g., front solar panel 90 and/or rear solar panel 91). Battery 220 may be one or multiple batteries and may power both controller 200 and SSM controller 202 and the components coupled to each controller, Solar panel 222 is coupled to battery 220 and acts to recharge battery 220. Solar panel 222 is physically located on the housing of meter mechanism 72 such that it may receive sunlight transmitted through the window located on the front and or rear surfaces of the outer housing of the meter. Controller 200 may receive data related to various operating states of power supply 212 and may communicate this data to parking management system 18 via wireless communication subsystem 210. For example, controller 200 may receive data regarding the charge state of battery 220, recharge rate of battery 220, the recharge effectiveness or efficiency of solar cell 222, etc. This data may be processed by parking management system 18 to determine whether a battery and/or solar cell in a particular single-space meter needs to be replaced.

Controller 200 also interfaces vehicle sensor 214. Vehicle sensor 214 may be pole-mount vehicle sensors 20, curb surface-mount sensor 22 or street surface-mount sensor 24 discussed above, or any other sensing device suitable for vehicle detection of the past, present or future. Vehicle sensor 214 generates a signal indicative of the vehicle located in the parking spot associated with electronic meter mechanism 72 and communicates the signal to controller 200. Controller 200 may communicate information related to the vehicle in the parking space to SSM controller 202, and SSM controller 202 may use this information to operate the devices under its control. For example, display 204 may be updated by SSM controller 202 based on the information from vehicle sensor 214 to prompt the user of the parking meter to select the method of payment to be used for the parking session. Controller 200 may also transmit data from vehicle sensor 214 to parking management system 18 using wireless communication subsystem 210. In one embodiment, processor 200 is configured to process the signal indicative of the presence of the vehicle within the parking space received from vehicle sensor 214 to determine whether a vehicle is parked in the parking space when the meter is expired. In this embodiment, processor 200 is configured to control wireless communication subsystem 210 to transmit data indicative of a vehicle parked at an expired meter to parking management system 18.

Controller 200 also interfaces with a credit card reader 218 configured to generate a signal indicative of credit card data of the credit card received by the reader. Credit card reader 218 includes a card detector 224 and a mag-strip reader 226. Card detector 224 detects the presence of a credit card being inserted into the slot of the credit card reader and information indicative of the presence of a credit card is communicated to controller 200. Controller 200 may communicate this information to SSM controller 202, and SSM controller 202 may update display 204 to indicate that payment by credit card is being used.

Controller 200 and/or SSM controller 202 may be configured to execute a function that allows the user to pay for parking using the credit card. Mag-strip reader 226 reads the credit card information from the user's credit card. The credit card information is communicated from mag-strip reader 226 to controller 200, and controller 200 communicates this information to a credit card authorization system using wireless communication subsystem 210 for authorization and processing. The credit card authorization system processes the credit card information, and approval information from the credit card authorization system is received by wireless communication subsystem 210 and is communicated to controller 200. If the payment by credit card is approved, controller 200 communicates credit card approval to SSM controller 202, and SSM controller 202 updates display 204 and adds time to the meter as appropriate. If payment by credit card is not approved, controller 200 communicates lack of credit card approval to SSM controller 202, and SSM controller 202 updates display 204 with the appropriate message and time is not added to the meter.

As shown in FIG. 13, communication between the various components of electronic meter mechanism 72 is provided by communication links 246. Communication links 246 may be dedicated wires or wireless communication connections. Communication links 246 may also represent communication over a network. Communication links 246 may be communication links provided on a printed circuit board, an integrated circuit or may be cable connections. One or more communication links 246 may utilize various standard cable connections (e.g., Ethernet, USB, RJ-11, etc.), and one or more communication links 246 may utilize custom or proprietary cable connections. In one embodiment, communication links 246 may be hardwired connections or couplings that allow for communication of data and also for the transmission of power from the power supply to the various device of the meter mechanism. In various embodiments, communication links 246 may be any combination of the types of links discussed herein.

In one embodiment, a new electronic meter mechanism 72 may be constructed utilizing a first controller 200 to control a first group of peripherals (e.g., devices 210, 212, 214 and 218) and a second controller 202 to control a second group of peripherals (e.g., devices 204, 206, 208 and 216). In other embodiments, an existing electronic meter mechanism 72 having an SSM meter controller 202 that controls a pre-existing group of peripherals (e.g., devices 204-208 and 216) is upgraded by the addition of controller 200 and a new group of peripherals (e.g., devices 210, 212, 214 and 218). In this embodiment, controller 200 may be physically present on a separate board or chip than controller 202, and controller 200 may be coupled to communicate with controller 202 to provide electronic meter mechanism 72 with the functions provided by the new group of peripherals. In another embodiment, the functionality of controller 200 and SSM controller 202 may be provided by a single controller (e.g., a single processing circuit including hardware and software to control devices 204-208 and 210-218).

In one embodiment, display 204 may be an upgraded display (e.g., a color display, high resolution display, graphical display, etc.) that is part of a retrofit unit. In one such embodiment, controller 200 (instead of SSM controller 202) may control the display of information via display 204 in order to provide updated software, processing power, etc. needed to control upgraded display 204. In this embodiment, the display control functionality of SSM controller 202 may be disabled and SSM controller 202 may only control devices 206, 208 and 216.

Figure 14:
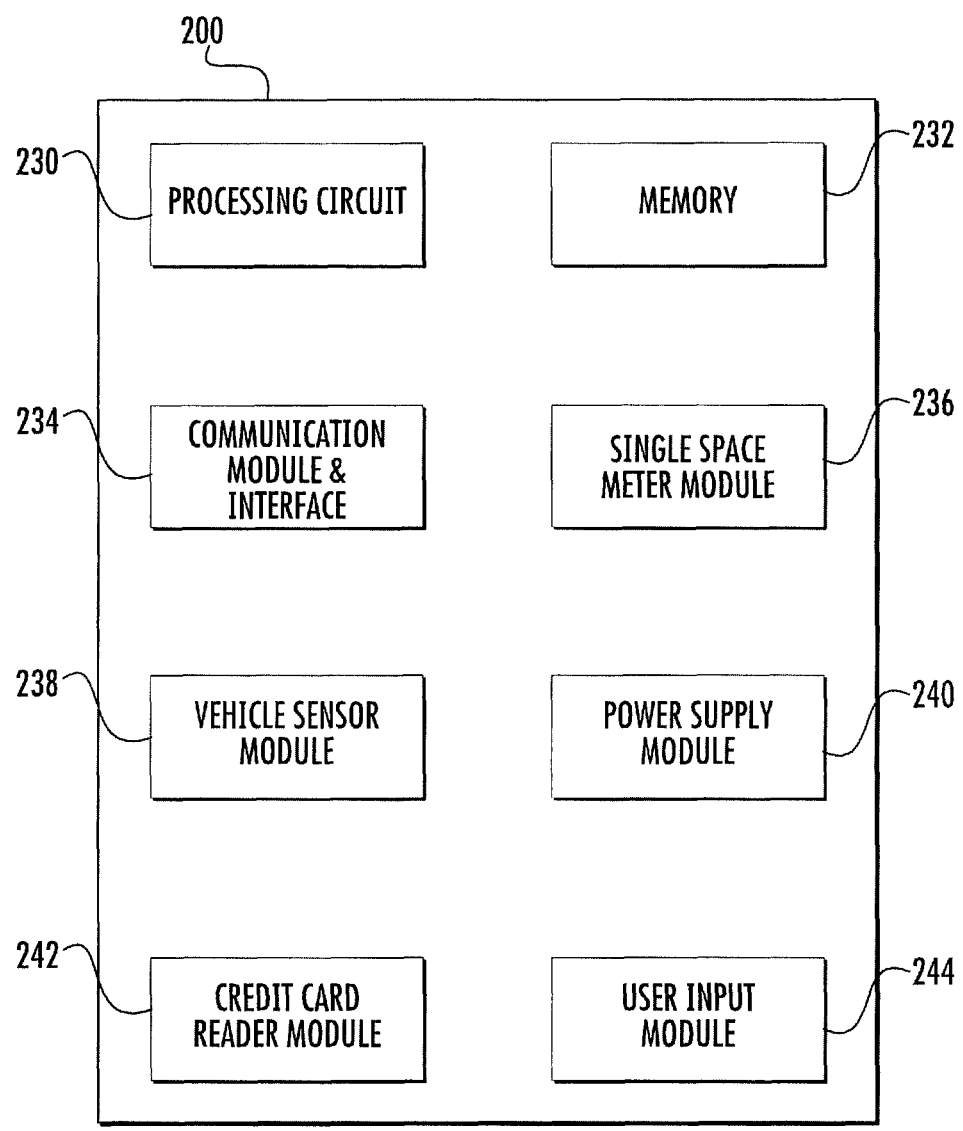
FIG. 14 is a block diagram of a controller for a parking meter according to an exemplary embodiment.

Referring to FIG. 14, a detailed block diagram of peripheral device and communication controller 200 is shown according to an exemplary embodiment. Controller 200 may generally be an electronic control unit suitable to provide electronic meter mechanism 72 with the various functionalities described herein. For example, controller 200 may be an embedded system, a dedicated circuit, a general purpose system or circuit programmed with the functionality described herein, etc. Controller 200 includes a processing circuit 230, memory 232, a communication module and interface 234, a single-space meter module 236, a vehicle sensor module 238, a power supply module 240, a credit card reader module 242. In one embodiment, controller 200 may include a user input module 244, which may be disabled in applications in which the user input device is controlled by SSM controller 202.

Processing circuit 230 may be a general purpose processor, an application specific processor (ASIC), a circuit containing one or more processing components, a group of distributed processing components, a group of distributed computers configured for processing, etc., configured to provide the functionality of module components of controller 200. Memory 232 (e.g., memory unit, memory device, storage device, etc.) may be one or more devices for storing data and/or computer code for completing and/or facilitating the various processes described in the present disclosure. Memory 232 may include volatile memory and/or non-volatile memory. Memory 232 may include database components, object code components, script components, and/or any other type of information structure for supporting the various activities described in the present disclosure.

According to an exemplary embodiment, any distributed and/or local memory device of the past, present, or future may be utilized with the systems and methods of this disclosure. According to an exemplary embodiment, memory 232 is communicably connected to processing circuit 230 and module components 234-244 (e.g., via a circuit or any other wired, wireless, or network connection) and includes computer code for executing one or more processes described herein. A single memory unit may include a variety of individual memory devices, chips, disks, and/or other storage structures or systems.

Module components 234-244 may be computer code (e.g., object code, program code, compiled code, script code, executable code, instructions, programmed instructions, non-transitory programmed instructions, or any combination thereof), hardware, software, or any combination thereof, for conducting each module's respective functions. Module components 234-244 may be stored in memory 232, or in one or more local, distributed, and/or remote memory units configured to be in communication with processing circuit 230 or another suitable processing system.

Communication module and interface 234 includes one or more components for communicably coupling controller 200 to the other components of parking system 10. For example, in the embodiment shown in FIG. 13, communication module and interface 234 includes one or more components for communicably coupling controller 200 to the other components of electronic meter mechanism 72 via communication links 246. As discussed in more detail below, communication module and interface 234 includes one or more components for communicably coupling controller 200 to various components of parking system 10 in various different configurations.

Communication module and interface 234 may include one or more jacks or other hardware for physically coupling communication links 246 to controller 200, analog to digital converters, digital to analog converters, signal processing circuitry, and/or other suitable components. Communication module and interface 234 may include hardware configured to connect controller 200 with the other components of electronic meter mechanism 72 via wireless connections. Communication module and interface 234 is configured to support the communication activities of controller 200 (e.g., negotiating connections, communication via standard or proprietary protocols, etc.). Communication module and interface 234 is also configured to support operation of wireless communication subsystem 210 to provide connectivity and communication between controller 200 and parking management system 18 via a wired or wireless network.

Single-space meter module 236 is configured to allow controller 200 to interface and communicate data with one or more SSM controllers 202. Vehicle sensor module 238 is configured to allow controller 200 to interface with, communicate data with and/or control one or more vehicle sensors 214. Power supply module 240 is configured to allow controller 200 to interface with, communicate data with and/or control power supply 212. Power supply module 240 may also be configured to regulate and distribute power from power supply 212 to power various components of controller 200, or other components of parking system 10 as needed in a particular arrangement. Credit card reader module 242 is configured to allow controller 200 to interface with, communicate data with and/or control credit card reader 218. Credit card reader module 242 is also configured to allow controller 200 to interface with a credit card authorization system to process credit card payments. User input module 244 is configured to allow controller 200 to interface with, communicate data with and/or control keypad 216.

In the embodiments shown in FIGS. 15-20, peripheral device and communication controller 200 is a multi-use controller that may be used to control various combinations of components of parking system 10. In these embodiments, controller 200 may be configured such that one design of controller 200 may be used in various configurations to control and communicate with different combinations of parking system components. Thus, a "universal" design of controller 200 provides for flexibility when utilizing controller 200 to upgrade or to provide functionality to an existing parking meter system.

Figure 15:
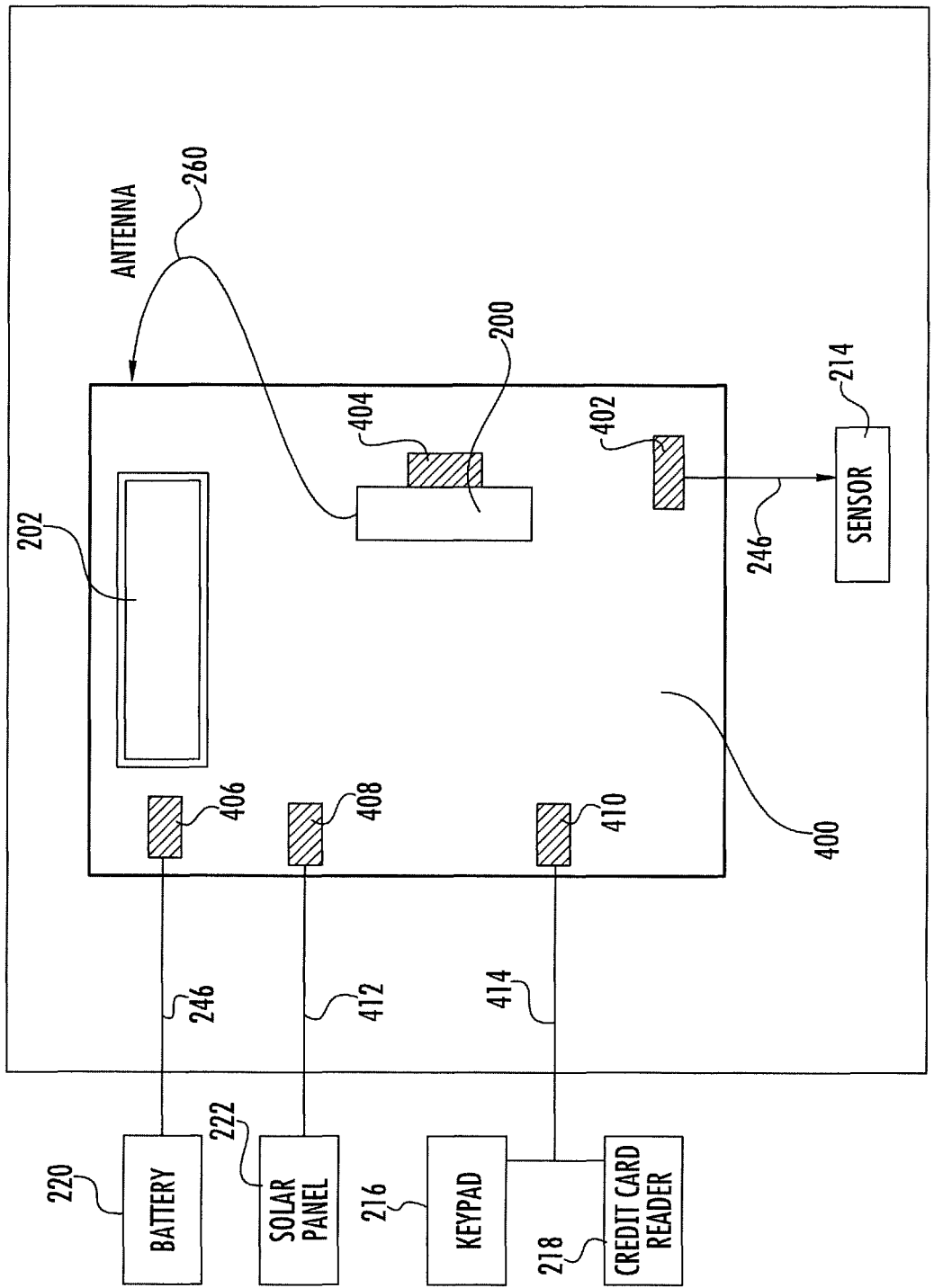
FIG. 15 shows a controller coupled to the main electronics board of a single-space meter according to an exemplary embodiment.

Referring to FIG. 15, an embodiment of peripheral device and communication controller 200 is shown as a multi-purpose peripheral board physically coupled to the main electronics board 400 of a single-space meter, such as single-space meter 12. In this embodiment, controller 200 provides one, single-space parking meter with control of additional peripheral devices 210, 212, 214 and 218 (shown in FIG. 13). As shown in FIG. 15, vehicle sensor 214 is a pole-mounted vehicle sensor 20 located in a lower pod or housing coupled to the pole of the parking meter (as shown for example in FIG. 1). In this embodiment, controller 200 is electrically coupled to and communicates with pole-mounted vehicle sensor 20 via a cable communication link 246. Cable communication link 246 is coupled at one end to a connector 402 physically coupled to main electronics board 400 and is coupled at the other end to pole-mount vehicle sensor 20.

Also shown in FIG. 15 a wireless communication antenna 260 is coupled to controller 200. Antenna 260 is part of wireless communication subsystem 210. As noted in FIG. 15, controller 200 may be configured for various types of wireless communication, including GPRS communication and local, RF communication. A processor connector 404 is coupled to controller 200 and provides a connection location for additional devices not shown in the embodiment of FIG. 15.

In the embodiment shown in FIG. 15, main electronics board 400 includes connectors 406, 408, and 410. In one embodiment, a wired communication link 246 connects main electronics board 400 to battery 220, and connector 406 couples wired communication link 246 to main electronics board 400. In one embodiment, battery 220 may include two distinct batteries, a primary battery and a backup battery. In one embodiment, battery 220 may include two distinct batteries, a rechargeable battery or battery pack, and a primary battery or battery pack as a backup source. A solar power cable 412 connects main electronics board 400 to one or more solar panels 222, and connector 408 couples wired communication link 246 to main electronics board 400. A cable 414 couples both keypad 216 and credit card reader 218 to main electronics board 400, and connector 410 couples cable 414 to main electronics board 400. In one embodiment cable 414 is an opto-cable.

Figure 16:
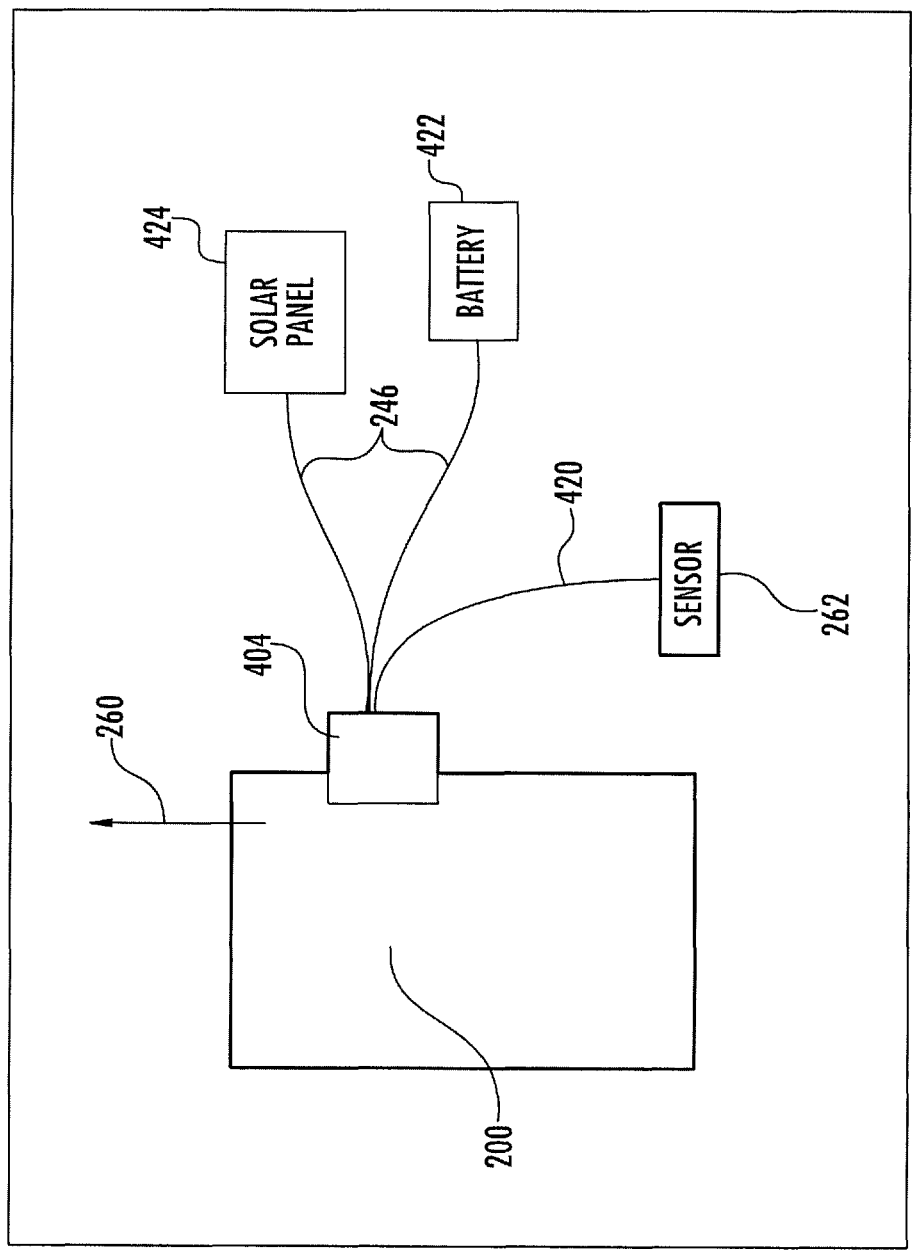
FIG. 16 shows a controller incorporated in a stand-alone vehicle sensor according to an exemplary embodiment.

In one embodiment shown in FIG. 16, peripheral device and communication controller 200 may be used to provide processing, communication and power supply management functionality for a stand-alone or meter-detached vehicle sensor, such as curb surface-mount sensor 22 or street surface-mount sensor 24. In this embodiment, controller 200 may be physically located within the sensor housing of either curb surface-mount sensor 22 or street surface-mount sensor 24. As part of the vehicle sensor assembly, controller 200 is configured to receive data from a vehicle sensing element 262 via either a wired or wireless communication. In the embodiment shown in FIG. 16, vehicle sensing element 262 is coupled to controller 200 by a wired, cable 420, and back connector 404 provides the interface and physical coupling between controller 200 and cable 420.

In one embodiment, controller 200 provides for the communication of data from vehicle sensing element 262 to the single-space meter, to the multi-space meter or to the gateway using RF communication, via antenna 260. In another embodiment, controller 200 provides for direct communication of data from the vehicle sensor to parking management system 18 using cellular communication, such as GPRS communication. As shown in FIG. 16, controller 200 also is coupled to a battery 422 and solar panel 424 via combined communication and power connections 246 and provides for power supply management for vehicle sensing element 262.

Figure 17:
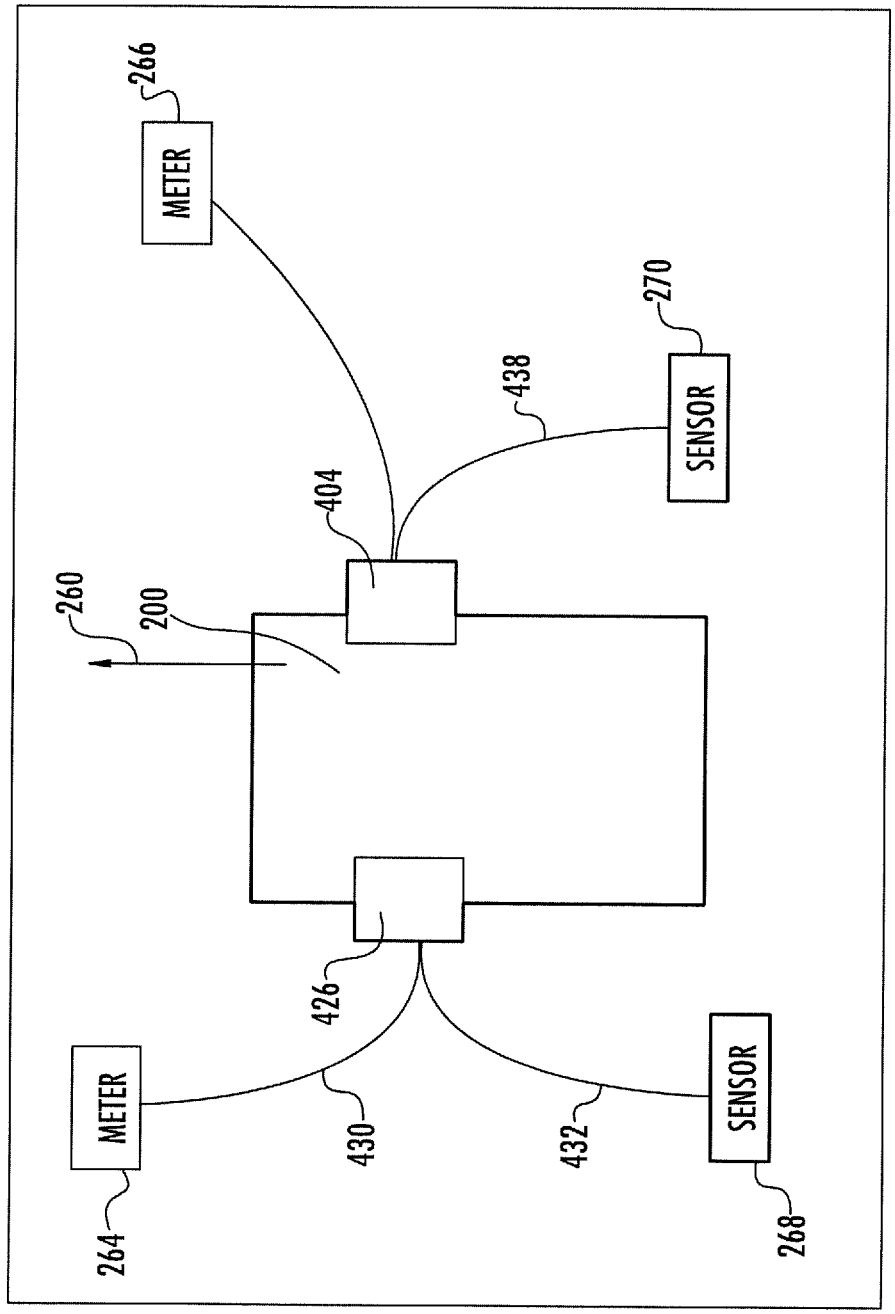
FIG. 17 shows a controller configured for the control of two single-space parking meters according to an exemplary embodiment.

Referring to FIG. 17, peripheral device and communication controller 200 is shown configured for the control of two single-space parking meters. In the embodiment shown, controller 200 is coupled to communicate with SSM controllers 202 of a first meter 264 and a second meter 266. Controller 200 is also coupled a first vehicle sensor 268 associated with first meter 264 and a second vehicle sensor 270 associated with second meter 266. In this embodiment, a single, controller 200 provides for communication with both vehicle sensors and for communication with parking management system 18 for both first meter 264 and second meter 266. This arrangement may be particularly advantageous when meters 264 and 266 are supported by a single pole and service adjacent parking spots. In one embodiment, first meter 264 and second meter 266 are single-space parking meters, and sensors 268 and 270 are pole mount vehicle sensors 20, mounted to a single support pole that supports both meters.

As shown in the embodiment of FIG. 17, controller includes both a back connector 404 and a front connector 426. A cable 430 couples meter 264 to controller 200, and front connector 426 provide the interface and physically couples cable 430 to controller 200. A cable 432 couples vehicle sensor 268 to controller 200, and front connector 426 physically couples cable 432 to controller 200. A cable 436 couples meter 266 to controller 200, and back connector 404 physically couples cable 436 to controller 200. A cable 438 couples sensor 270 to controller 200, and back connector 404 physically couples cable 438 to controller 200.

Figure 18:
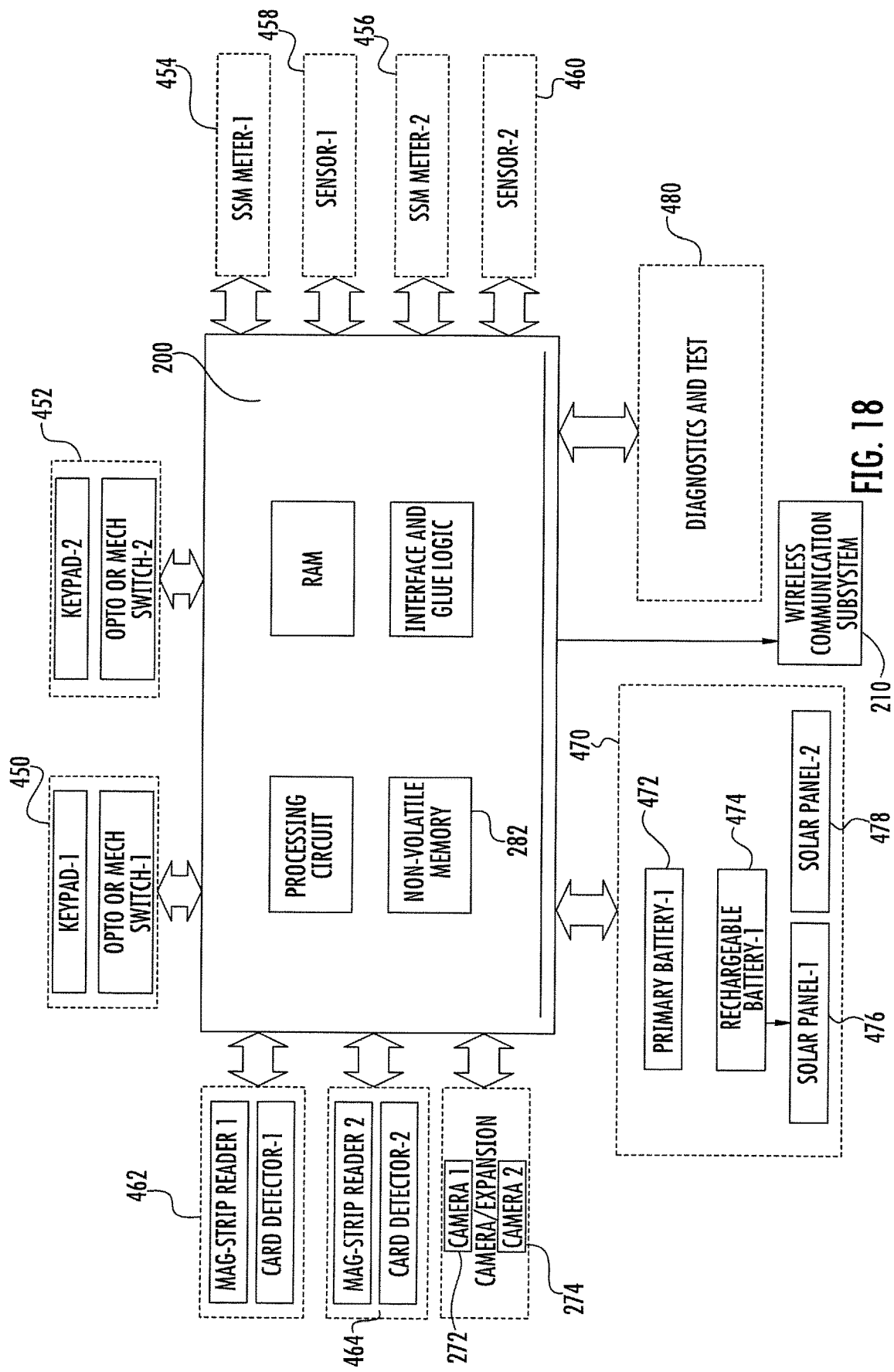
FIG. 18 shows a detailed block diagram of a controller configured for the control of two sets of peripheral devices for two single-space parking meters according to an exemplary embodiment.

Referring to FIG. 18, a detailed block diagram of a single peripheral device and communication controller 200 is shown providing control of two sets of additional peripheral devices 210-218 (discussed in detail above regarding FIG. 13) for two single-space parking meters. FIG. 18 shows a single controller 200 interfacing with two single-space meters, a vehicle sensor associated with each meter, a battery and solar panel associated with each meter, a keypad associated with each meter and a credit card reader associated with each meter.

Specifically, FIG. 18 shows controller 200 coupled to a first keypad 450 associated with the first single-space parking meter and to a second keypad 452 associated the second single-space parking meter. Controller 200 is coupled to a first SSM controller 454 associated with the first single-space parking meter and to a second SSM controller 456 associated with the second single-space parking meter. Controller 200 is coupled to a first vehicle sensor 458 associated with the first single-space parking meter and to a second vehicle sensor 460 associated with the second single-space parking meter. Controller 200 is coupled to a first credit card reader 462 associated with the first single-space parking meter and to a second credit card reader 464 associated with the second single-space parking meter.

In the embodiment of FIG. 18, controller 200 is coupled to a power subsystem 470 that provides power to both the first and second single-space meters. Controller 200 is configured to regulate and to control power distribution to the devices of both the first and second single-space meters from the single power subsystem 470. Power subsystem 470 includes a primary battery 472, a rechargeable battery 474, a first solar panel 476 coupled to rechargeable battery 474 and a second solar panel 478. Controller 200 is also coupled to a single wireless communication subsystem 210. In this embodiment, controller 200 controls wireless communication between both the first and second single-space meters and parking management system 18. This arrangement allows a single controller 200 and a single set of wireless communications hardware to provide wireless communication with parking management system 18 for two parking meters. In other embodiments, controller 200 is configured to control at least two single-space meters and to control wireless communications for at least two single-space meters.

Controller 200 is also configured for connection to and communication with a diagnostic and test system 480. Diagnostic and test system 480 may be located within parking management system 18 and may utilize the wireless communication functionality of controller 200 to run diagnostics on either of the single-space meters or controller 200. In other embodiments, diagnostic and test system 480 may be a system that is physically coupled to the meter to run diagnostics on either of the single-space meters or controller 200.

Further, FIG. 18 shows controller 200 communicably coupled to a camera module, shown including a first camera 272 and a second camera 274, each associated with one of the single-space meters. Cameras 272 and 274 are configured to capture image data of the vehicle located in the parking spot associated with each meter, and specifically may be configured to obtain an image of the license plate of each vehicle located in each parking spot. This information may then be communicated to parking management system 18 for processing and for use related to an enforcement activity (e.g., the mailing of a parking ticket directly to the owner of the vehicle if parking regulations were violated). Further, controller 200 may be coupled to non-volatile memory 482 to provide for additional local data storage. In one embodiment, non-volatile memory 482 may be flash memory of different any size desired for a particular application (e.g., 1 MB, 2 MB, 3 MB, 5 MB, 10 MB, etc.). In one embodiment, diagnostics and test system 480 may be testing and diagnostics software embedded on non-volatile flash memory 482.

Figure 19:
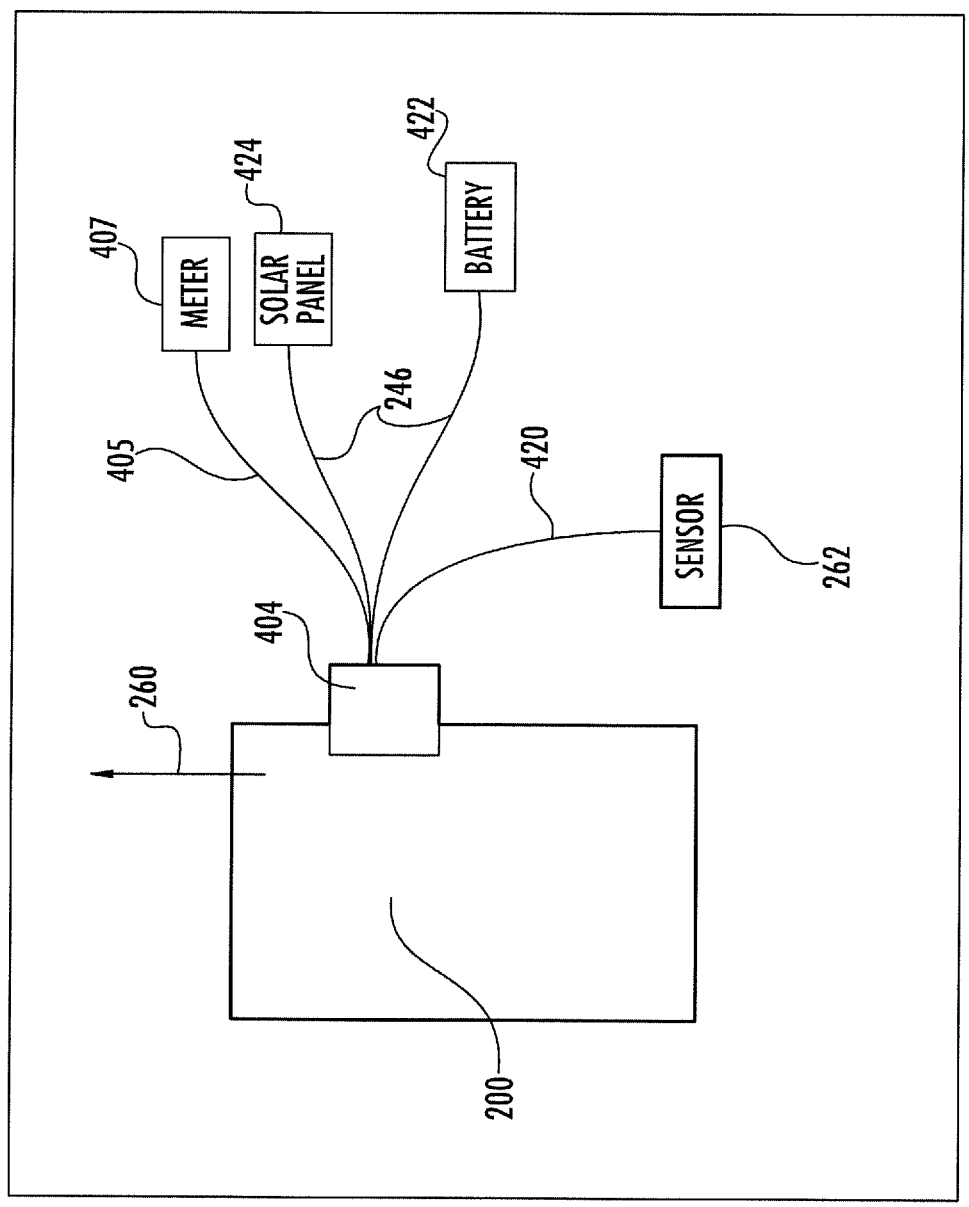
FIG. 19 shows a controller configured to provide additional functionality as a retrofit for a single-space meter according to an exemplary embodiment.

Referring to FIG. 19, peripheral device and communication controller 200 is shown providing vehicle sensing functionality, solar cell/battery functionality and communication functionality as a retrofit unit for a single-space meter. In this embodiment, the pre-existing single-space meter 407 is connected to controller 200 using an RJ-11 connection 405, and communication between controller 200 and SSM controller 202 occurs via the RJ-11 connection. In another embodiment, controller 200 provides only vehicle sensing functionality and solar/battery functionality to meter 407, but does not provide for communication to parking management system 18.

Figure 20:
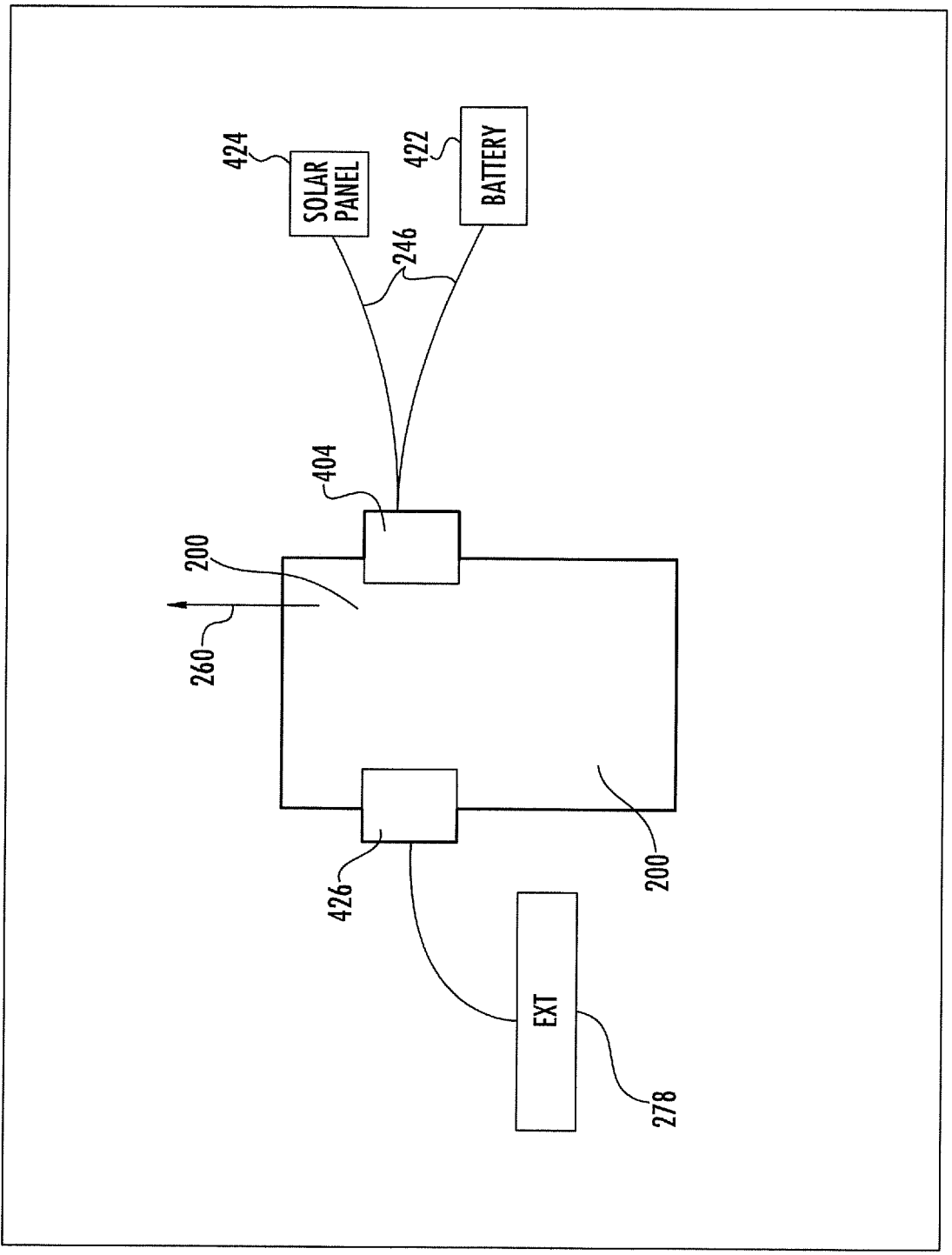
FIG. 20 shows a controller configured to function as a gateway for a parking system according to an exemplary embodiment.

Referring to FIG. 20, peripheral device and communication controller 200 may be configured to act as a gateway (such as gateway 36 and 38 discussed above) to receive information from parking meters or from stand-alone vehicle sensors within parking system 10 and to communicate the received information via a wireless network to parking management system 18. In this embodiment, controller 200 is coupled to a power supply having one or more solar panel and a battery. Controller 200 is also coupled to a modem, such as wireless modem 278, for cellular communication (e.g., 2.5 G, 3G, 4G, etc.) with parking management system 18. In other embodiments, controller 200 utilized as a gateway can communicate with parking management system 18 using other methods (e.g., WIFI, various wired connections, etc.).

Referring to FIG. 21, a process for upgrading a single-space parking meter 300 with a new electronic meter mechanism, such as electronic meter mechanism 72, is shown, according to an exemplary embodiment. Single-space meter 300 includes an existing electronic meter mechanism 302 having a payment structure 304. In one embodiment, payment structure 304 of existing electronic meter mechanism 302 includes a coin slot and a smart card reader, but does not include a credit card reader having a mag-strip reader. In another embodiment, payment structure 304 of old single-space meter 300 includes a coin slot, but does not include either a credit card reader with a mag-strip reader or a smart card reader (see FIG. 25).

As shown in FIG. 21(A) and FIG. 21(B), existing electronic meter mechanism 302 is located within an outer meter housing 306, and outer meter housing 306 defines an internal space that receives existing electronic meter mechanism 302. A window 308 is located in an upper portion 310 of housing 306 such that the display of existing electronic meter mechanism 302 is visible through window 308. To remove existing electronic meter mechanism 302, outer meter housing 306 is unlocked, and upper portion 310 is moved exposing existing electronic meter mechanism 302. In the embodiment shown in FIG. 21(B), upper portion 310 is connected to a lower portion 314 of outer meter housing 306 via a hinge 312, and upper portion 310 is rotated about hinge 312 exposing existing electronic meter mechanism 302. In other embodiments, upper portion 310 of meter housing may be coupled to lower portion 314 via other types of connections or couplings. For example, upper portion 310 may include a structure (e.g., a dove-tail) that is received within a corresponding structure of lower portion 314, and upper portion disengages from or slides off of lower portion 314.

As can be seen in FIGS. 21(A) and 21(B), payment structure 304 of existing meter mechanism 302 is received within a preexisting payment opening, shown as aperture 316, located in the front or sidewalk-facing face of outer meter housing 306. Payment structure 304 of existing meter mechanism 302 extends through aperture 316 a short distance such that the front surface of payment structure 304 is slightly recessed or is substantially flush with the front surface of outer meter housing 306 and does not extend out of aperture 316 beyond the front face of the meter housing.

As shown in FIG. 21(C), with upper portion 310 moved or removed, existing electronic meter mechanism 302 is lifted upwardly and out of meter housing 306 exposing the inner cavity 318 of meter housing 306. As shown in FIG. 21(D), a new electronic meter mechanism 72 is placed into cavity 318 of meter housing 306. It should be noted that new electronic meter mechanism 72 fits within the same cavity 318 of meter housing 306 as old electronic meter mechanism 302, without requiring revision, alteration or widening of cavity 318 or alteration of outer meter housing 306.

As can be seen in FIG. 21(C), payment/user-interface structure 82 of electronic meter mechanism 72 extends through aperture 316 a distance such that the front surface of payment/user interface structure 82 is spaced a distance from front face of meter housing 306. In this embodiment, both the entry slot of the credit card reader and the money slot of the new meter mechanism 72 are accessible through preexisting aperture 316. It should be noted that payment/user-interface structure 82 is sized such that it fits through the same aperture 316 as payment structure 304 of the old electronic meter mechanism 302. Payment/user-interface structure 82 is sized such that it fits through the same aperture 316 as payment structure 304 of the old electronic meter mechanism 302 without requiring revision, alteration or widening of aperture 316. Further, the portion of housing 306 immediately below aperture 316 is received within gap 284 (shown in FIG. 23) of the new meter mechanism 72.

Referring to FIG. 21(F) and FIG. 21(G), with new meter mechanism 72 placed within cavity 318, upper portion 310 is rotated to the closed position such that new meter mechanism 72 is secured within meter housing 306 such that the display screen of meter mechanism 72 is viewable through window 308. It should be noted, that new meter mechanism 72 is sized such that upper portion 310 can close over new meter mechanism 72 without requiring revision to upper portion 310. Following closure of upper portion 310, outer housing 306 may be locked sealing electronic meter housing 72 within housing 306. As can be seen in FIG. 21(E) and FIG. 21(G), front solar panel 90 of electronic meter mechanism 72 is positioned such that with upper portion 310 in the closed position, front solar panel 90 is located within outer meter housing 306 and below window 308. This configuration allows both light to strike front solar panel 90 while providing solar panel 90 with the protection afforded by meter housing 306. Rear solar panel 91 is positioned such that light that passes through the rear window strikes rear solar panel 91. In these embodiments, window 308 (and the rear window) are in substantially the same position or location after the new meter mechanism is installed and meter housing 306 is closed.

Thus, as shown in FIGS. 21(A)-21(G), an old electronic meter mechanism may be replaced with a new meter mechanism 72 providing an updated or upgraded parking meter that provides the various functionalities discussed herein. Specifically, in one embodiment, new meter mechanism 72 provides a parking meter having a credit card reader, a money sensor, a display, a smart card reader, a user interface (e.g., a keypad) and a solar panel and battery that fits inside the same outer housing that held the old meter mechanism without requiring any revision to the outer meter housing. The outer housing that holds new meter mechanism has the same size, shape and internal volume as it did holding the old meter mechanism. Further, new meter mechanism 72 also provides capability for wireless communication with parking management system 18 within the same outer housing that held the old meter mechanism without requiring any revision to or restructuring of the outer meter housing, and new meter mechanism 72 also provides for communication with a vehicle sensor and processing of vehicle sensor data within the same outer housing that held the old meter mechanism without requiring any revision to or restructuring of the outer meter housing. In one embodiment, the upgrade method includes delivering an upgraded meter mechanism, such as meter mechanism 72, to a recipient, and the recipient preforms the steps to remove the old meter and add the new meter to the housing, shown in FIGS. 21(A)-21(G). Further, meter mechanism 72 is shaped and is positioned within the outer meter housing to be accessible from a wheelchair, and in one specific embodiment, following insertion of meter mechanism 72 into the outer housing, the user input, payment devices and display are positioned at a height above the ground and at an angle in order to be compliant with the Americans with Disabilities Act.

Figure 25A:
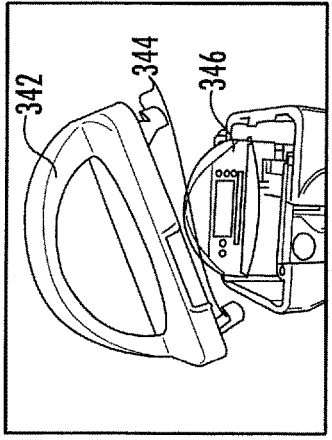
FIGS. 25A, 25B, 25C, 25D, 25E, 25F, 25G, 25H, and 25I show a process of upgrading a single-space parking meter with a new electronic meter mechanism according to an exemplary embodiment.
Figure 25B:
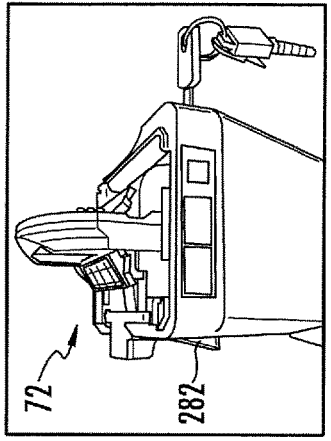
Figure 25C:
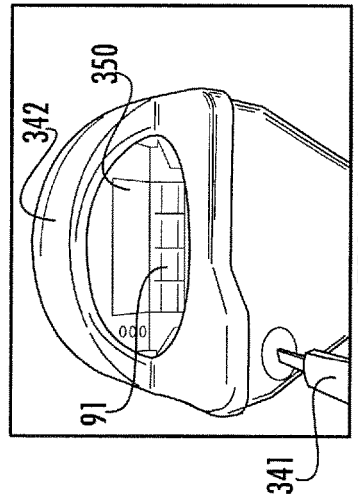
Figure 25D:
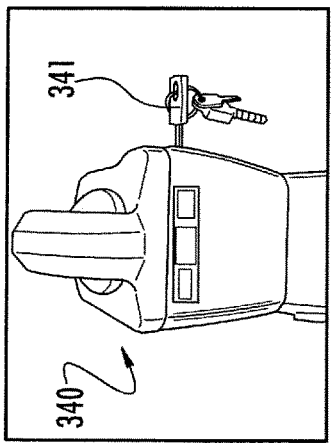
Figure 25E:
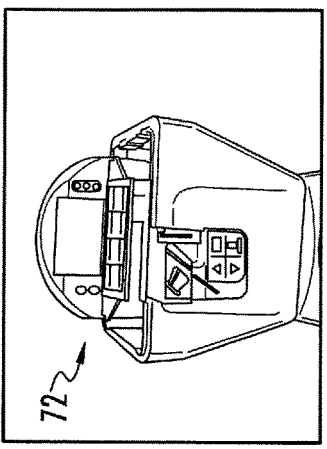
Figure 25F:
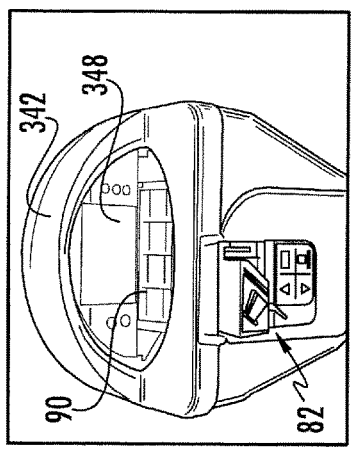
Figure 25G:
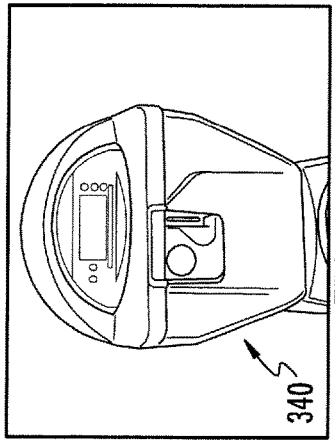
Figure 25H:
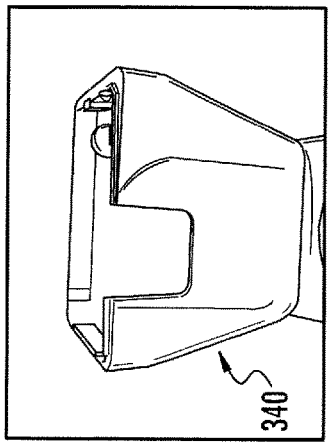
Figure 25I:
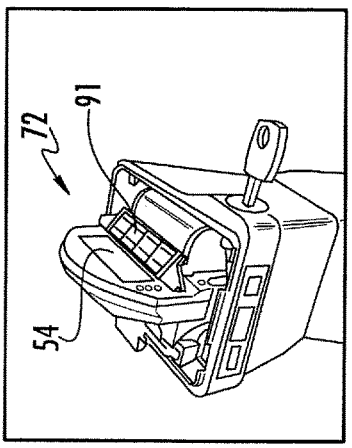
Figure 26:
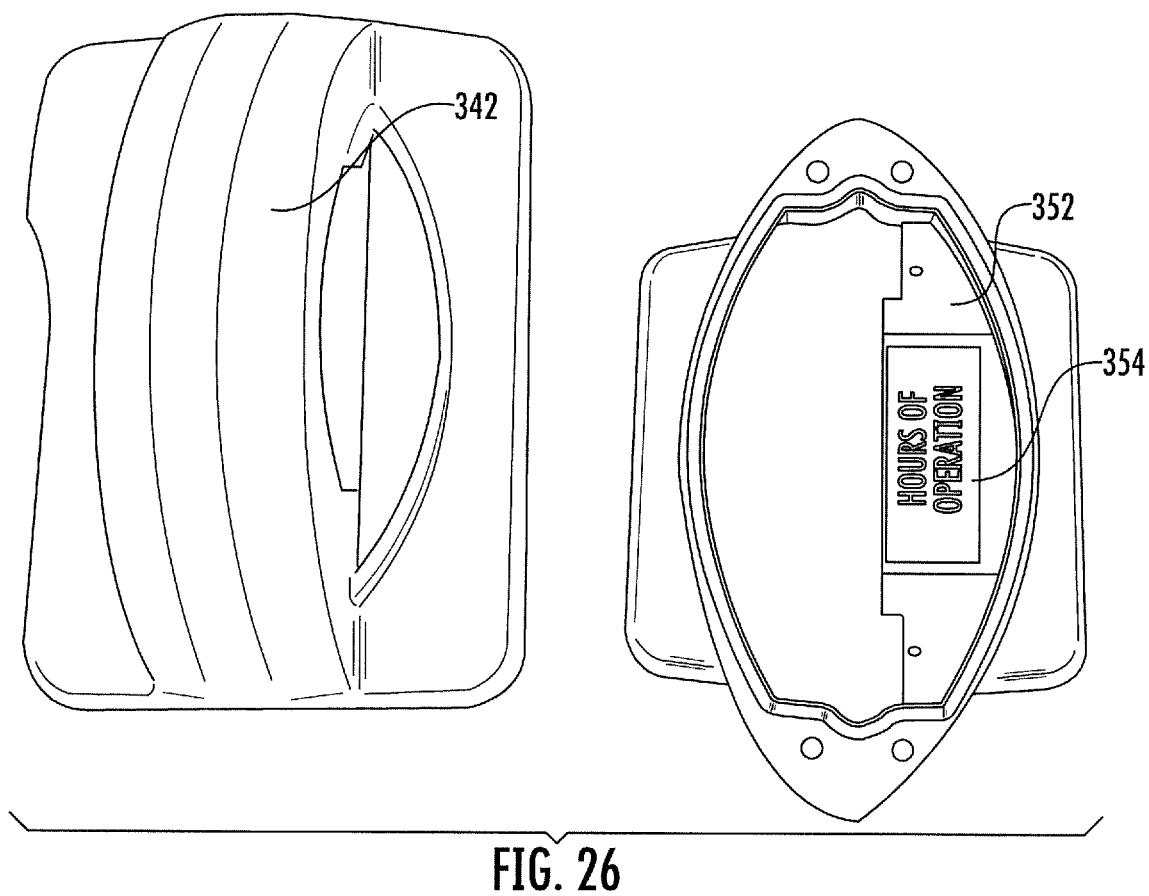
FIG. 26 shows a meter housing cap following revision to accommodate an electronic meter mechanism that includes front and rear solar panels.

Referring to FIG. 25 and FIG. 26, a process for upgrading a single-space parking meter 340 with a new electronic meter mechanism, such as electronic meter mechanism 72, is shown, according to an exemplary embodiment. The process shown in FIG. 25 and FIG. 26 is similar to the process shown FIG. 21 except for the primary differences discussed below. FIG. 25(A) shows a parking meter 340, and FIG. 25(B) shows the housing of parking meter 340 being unlocked by key 341. As shown in FIG. 25(C), parking meter 340 includes an upper housing portion or cap 342 that is not connected via a hinge to the lower meter housing. In the embodiment shown, upper housing portion 342 includes brackets 344 that engage corresponding structures in the lower meter housing. Upper housing portion 342 is removed by disengaging brackets 344 from the lower housing.

With upper housing portion 342 removed, old meter mechanism 346 may be removed leaving the lower housing of meter 340 empty as shown in FIG. 25(D). Parking meter 340 may be upgraded by inserting or installing a new meter mechanism 72 into the cavity of the lower housing of meter 340, as shown in FIG. 25(E). Old meter mechanism 346 is an example of a meter mechanism having only a coin payment mechanism that may be replaced with electronic meter mechanism 72.

Referring to FIG. 25(F), electronic meter mechanism 72 is shown received within the meter housing. With electronic meter mechanism 72 received within the outer meter housing, rear surface 288 (shown in FIG. 23) of keypad housing 282 is positioned substantially flush against the front surface of the outer meter housing. As noted above, this engagement may assist in properly locating electronic meter mechanism 72 relative to the outer meter housing and may assist is coupling electronic meter mechanism 72 to the outer meter housing. As shown in FIG. 25(G), rear solar panel 91 is positioned on the shelf extending from below display 54 such that, when cap 342 is reconnected to the lower meter housing, rear solar panel 91 is located below the rear window formed in cap 342. This arrangement allows light to pass through the rear window and to strike rear solar panel.

Referring to FIGS. 25(H) and 25(I), front and rear views, respectively, of meter 340 are shown following installation of electronic meter mechanism 72. As shown in FIG. 25(H), front solar panel 90 is located beneath the front window 348 of upper housing portion 342. As shown in FIG. 25(I), rear solar panel 91 is located beneath rear window 350 of upper housing portion 342. In one embodiment, upper housing portion 342 may be placed over electronic meter mechanism 72 and coupled to the lower housing portion without requiring revision or modification to the meter housing.

Alternatively, in some embodiments, depending on the configuration of the meter housing containing old electronic meter mechanism 346, some revision to the meter housing may be needed in order to install electronic meter mechanism 72. For example, referring to FIG. 26, upper housing portion 342 may include a plate 352. Plate 352 includes a panel 354 containing information (e.g., rate information, parking times, etc.) that is visible through rear window 350 prior to meter upgrade and is positioned in the area that will be occupied by rear solar panel 91. Thus, in one embodiment, plate 352 may be removed from upper housing portion 342 during the installation of electronic meter mechanism 72, so that rear solar panel 91 is not covered by plate.

Figure 27:
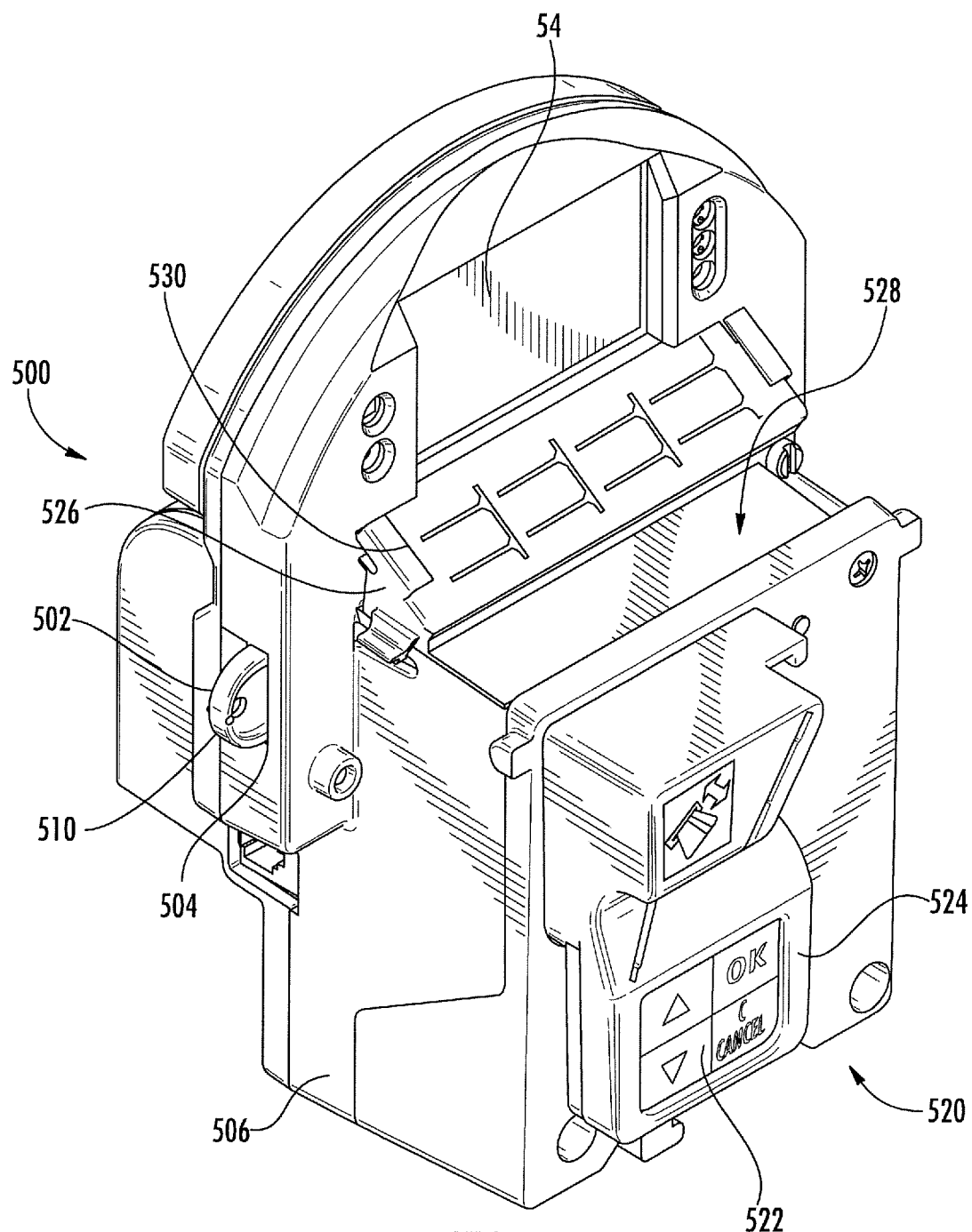
FIG. 27 shows a perspective view of an electronic meter mechanism with a removable memory device according to an exemplary embodiment.
Figure 28:
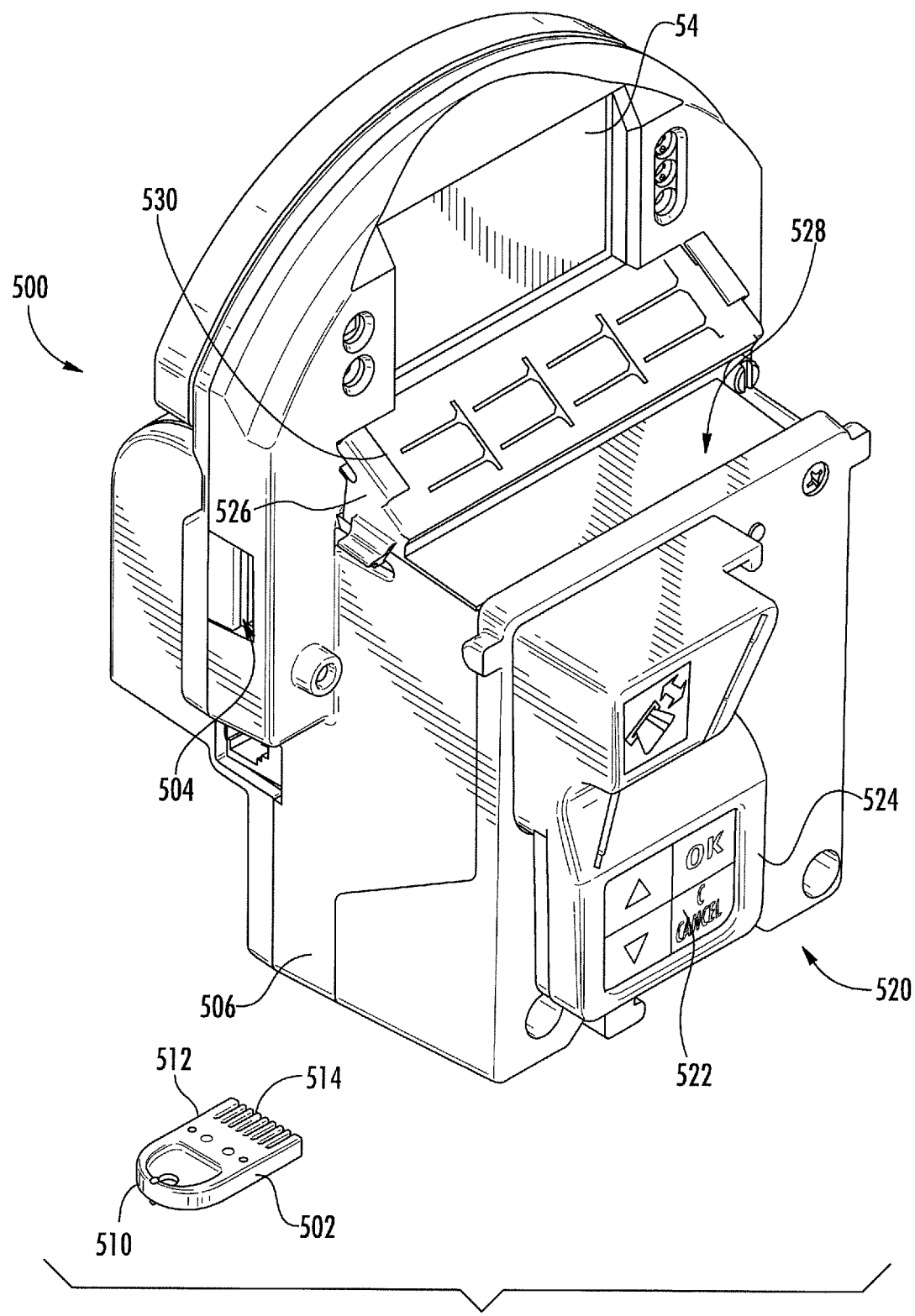
FIG. 28 shows the electronic meter mechanism of FIG. 27 with the removable memory device removed according to an exemplary embodiment.

Referring to FIG. 27 and FIG. 28, another embodiment of electronic meter mechanism, shown as electronic meter mechanism 500, is shown according to an exemplary embodiment. Electronic meter mechanism 500 is substantially similar to meter mechanism 72 except for the differences noted below. Electronic meter mechanism 500 includes a removable memory device 502 and a memory device port, shown as slot 504. FIG. 27 shows removable memory device 502 received within slot 504. Slot 504 is an opening or aperture that extends through inner housing 506 that allows removable memory device 502 to engage electrical contacts of a memory device reader located inside inner housing 506. In the embodiment shown in FIG. 27, slot 504 is formed through a lateral surface of inner housing 506. Lateral positioning of slot 504 makes slot 504 and memory device 502 less conspicuous to the user of meter 12, when the meter mechanism is received within outer housing 42.

Referring to FIG. 28, memory device 502 includes an outer section 510 and an inner portion 512 including electrical contacts 514. When installed into slot 504, inner portion 512 is received within inner housing 506 and electrical contacts 514 are engaged with opposing contacts of a memory device reader located within slot 504. The electrical contact provided by electrical contacts 514 allows parking meter control system 50 to read and write data to memory device 502. Electrical contacts 514 provide a sliding electrical contact with the corresponding contacts within outer housing 506. Outer section 510 extends outward beyond the outer surface of inner housing 506 and provides a gripping surface that may be gripped to remove or install memory device 502.

Single space meter 12 includes a removable, read-write memory device 502. Generally, removable memory device 502 stores information and/or software that can be utilized by single space meter 12 to allow single space meter 12 to operate properly based on the physical location of meter 12 within parking system 10 and based upon the particular parking system 10 (e.g., meter configurations specialized for a particular city such display of city name). As explained in more detail below, memory device 502 may be removed from a first, current or pre-existing meter mechanism 500 located within a particular outer meter housing 70 and inserted into a socket or port on a new meter mechanism 500 that is to replace the current meter mechanism. The new meter mechanism 500 reads the data from memory device 502 and utilizes the data to program the new meter mechanism 500 to function properly based on the physical location of meter 12 within parking system 10 and based upon the particular parking system 10.

In various embodiments, memory device 502 may store location identification information representative of the physical location of outer meter housing 70 that the new meter mechanism is being installed into. Memory device 502 may also include payment information representative of parking payments received by the meter. For example payment information may include audit data indicating the amount of currency that has been received by the meter and that should be located in the currency holder within outer meter housing 70. Payment information may also include information regarding credit card transactions received by the meter including batched credit card transaction data that were not able to receive real-time credit card authorization. Memory device 502 may also include meter mechanism configuration data. Configuration data may include rate information (e.g., information indicating the parking rate and parking times that the rate applies), display configuration files (e.g., data that is used by the meter mechanism controller to display the appropriate information on the electronic display screen of the meter) and meter software/firmware (e.g., the appropriate software/firmware versions that allow the meter mechanism to operate within the particular parking system).

Further, meter mechanism 500 includes an integrated payment and input structure 520 that includes a four button key pad 522. Key pad 522 is vertically oriented having a front face that is substantially parallel to the vertical axis of meter mechanism 500. Further, key pad 522 is located in a depression or recess formed in key pad housing 524 such that the front surface of key pad 522 is recess relative to key pad housing 524. Meter mechanism 500 includes a front solar panel 530 located on a front support 526. Front support 526 is a portion of inner housing 506 that extends upward from a horizontal surface 528 located below display screen 54 and above key pad 522. Front support 526 includes an upper surface that supports solar panel 530. As shown in FIG. 27, front support 526 is positioned and oriented such that solar panel 530 is in substantially the same position and orientation as solar panel 90 shown in FIG. 9.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. While the current application recites particular combinations of features in the various embodiments discussed herein, various embodiments of the invention relate to any combination of any of the features described herein, and any such combination of features may be claimed in this or future applications. Any of the features, elements, or components of any of the exemplary embodiments discussed above may be claimed alone or in combination with any of the features, elements, or components of any of the other embodiments discussed above.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. In various exemplary embodiments, the relative dimensions, including angles, lengths and radii, as shown in the Figures are to scale. Actual measurements of the Figures will disclose relative dimensions and angles of the various exemplary embodiments. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An electronic parking meter mechanism comprising:
an inner housing including a front side and a rear side;
an electronic display screen supported by the inner housing;
a first processor configured to control the electronic display screen;
a wireless communication subsystem supported by the inner housing configured to wirelessly communicate with a parking management system; and a second processor configured to control communication of data by the wireless communication subsystem.

* * * * *